United States Patent
Yamano et al.

(10) Patent No.: US 10,162,480 B2
(45) Date of Patent: Dec. 25, 2018

(54) INFORMATION PROCESSING APPARATUS, INFORMATION PROCESSING METHOD, PROGRAM, AND INFORMATION PROCESSING SYSTEM

(71) Applicant: SONY CORPORATION, Tokyo (JP)

(72) Inventors: Ikuo Yamano, Tokyo (JP); Kazuyuki Yamamoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/690,802

(22) Filed: Aug. 30, 2017

(65) Prior Publication Data
US 2017/0364240 A1 Dec. 21, 2017

Related U.S. Application Data

(63) Continuation of application No. 14/385,381, filed as application No. PCT/JP2013/002502 on Apr. 12, 2013, now Pat. No. 9,772,744.

(30) Foreign Application Priority Data

Apr. 19, 2012 (JP) ................. 2012-095497

(51) Int. Cl.
*G06F 3/0481* (2013.01)
*G06F 3/0484* (2013.01)
*G06F 3/0488* (2013.01)

(52) U.S. Cl.
CPC ........ *G06F 3/04817* (2013.01); *G06F 3/0488* (2013.01); *G06F 3/04842* (2013.01); *G06F 3/04886* (2013.01); *G06F 2203/04808* (2013.01)

(58) Field of Classification Search
CPC ............... G06F 3/0416; G06F 3/04883; G06F 3/03547; G06F 2203/0382;
(Continued)

(56) References Cited

U.S. PATENT DOCUMENTS

2009/0002218 A1  1/2009 Rigazio et al.
2009/0007001 A1* 1/2009 Morin ............... G06F 3/0237
                                                715/773
(Continued)

FOREIGN PATENT DOCUMENTS

CN  101739208 A  2/2010
CN  102365611 A  2/2012
(Continued)

OTHER PUBLICATIONS

Dec. 27, 2016, JP communication issued for related JP application No. 2016-088296.
(Continued)

*Primary Examiner* — Md Saiful A Siddiqui
(74) *Attorney, Agent, or Firm* — Paratus Law Group, PLLC

(57) ABSTRACT

There is provided an information processing apparatus including an operation surface configured to receive touch inputs, and a sensor unit configured to detect at least one right-side touch input from a manipulation by a user of the operation surface within a first operational area of the operation surface, and at least one left-side touch input from a manipulation by the user of the operation surface within a second operational area of the operation surface, wherein the first operational area and the second operational area of the operation surface are mapped to a graphical user interface (GUI) area of a display device.

24 Claims, 19 Drawing Sheets

(58) Field of Classification Search
CPC ....... G09G 2340/0407; G09G 2360/04; G09G 2300/026; G09G 2300/02; G09G 2360/06
See application file for complete search history.

(56) References Cited

U.S. PATENT DOCUMENTS

| | | |
|---|---|---|
| 2009/0295730 A1 | 12/2009 | Shin et al. |
| 2010/0103127 A1* | 4/2010 | Park .................. G06F 3/04886 345/173 |
| 2010/0127997 A1 | 5/2010 | Park et al. |
| 2010/0164897 A1 | 7/2010 | Morin et al. |
| 2011/0304567 A1 | 12/2011 | Yamamoto et al. |
| 2011/0310021 A1 | 12/2011 | Choi et al. |
| 2012/0007823 A1 | 1/2012 | Ozawa et al. |
| 2012/0062603 A1 | 3/2012 | Mizunuma et al. |
| 2012/0092299 A1 | 4/2012 | Harada et al. |
| 2012/0117501 A1 | 5/2012 | Koch et al. |
| 2013/0241832 A1 | 9/2013 | Rimon et al. |

FOREIGN PATENT DOCUMENTS

| | | |
|---|---|---|
| JP | 61-259331 | 11/1986 |
| JP | 6-282368 | 10/1994 |
| JP | 11-161426 | 6/1999 |
| JP | 2009-253773 | 10/2009 |
| WO | WO2011/096166 A1 | 8/2011 |
| WO | WO2012-005005 A1 | 1/2012 |

OTHER PUBLICATIONS

Sep. 29, 2016, CN communication issued for related CN application No. 201380019572.8.
Nov. 1, 2016, JP communication issued for related JP application No. 2016-088296.
Dec. 3, 2015, JP communication issued for related JP application No. 2012-095497.
Jan. 26, 2016, JP communication issued for related JP application No. 2012-095497.
Aug. 23, 2018, European Communication issued for related EP Application No. 13723974.5.

* cited by examiner

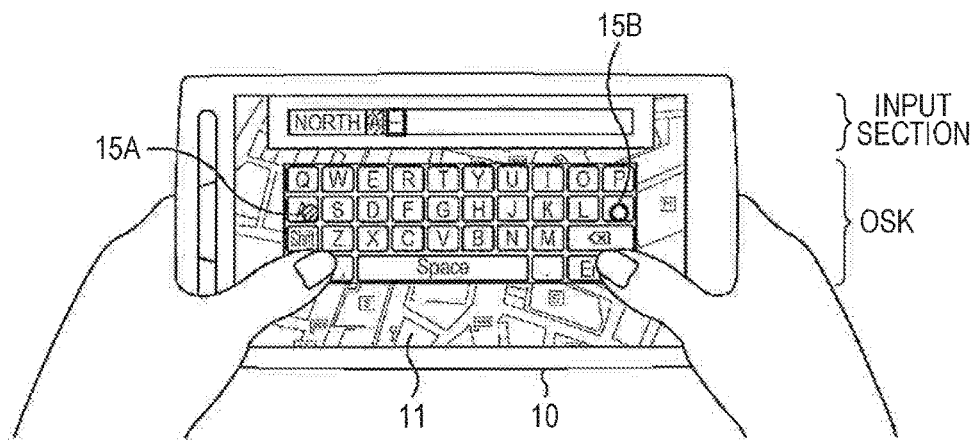
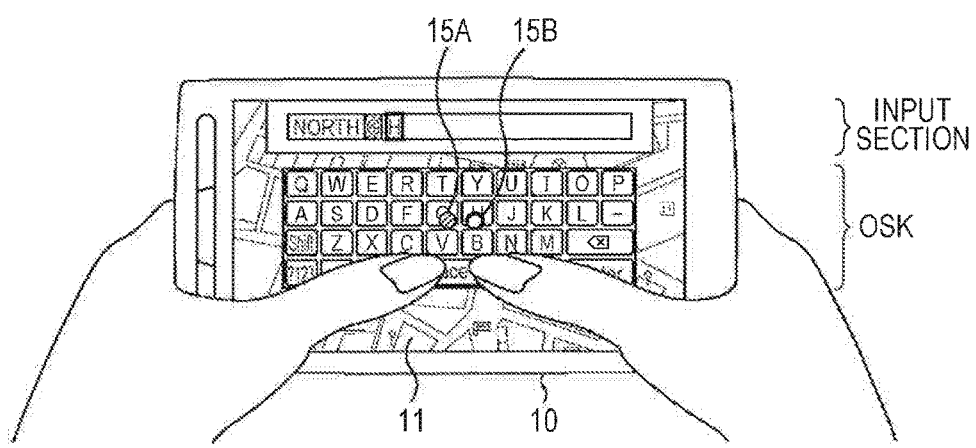

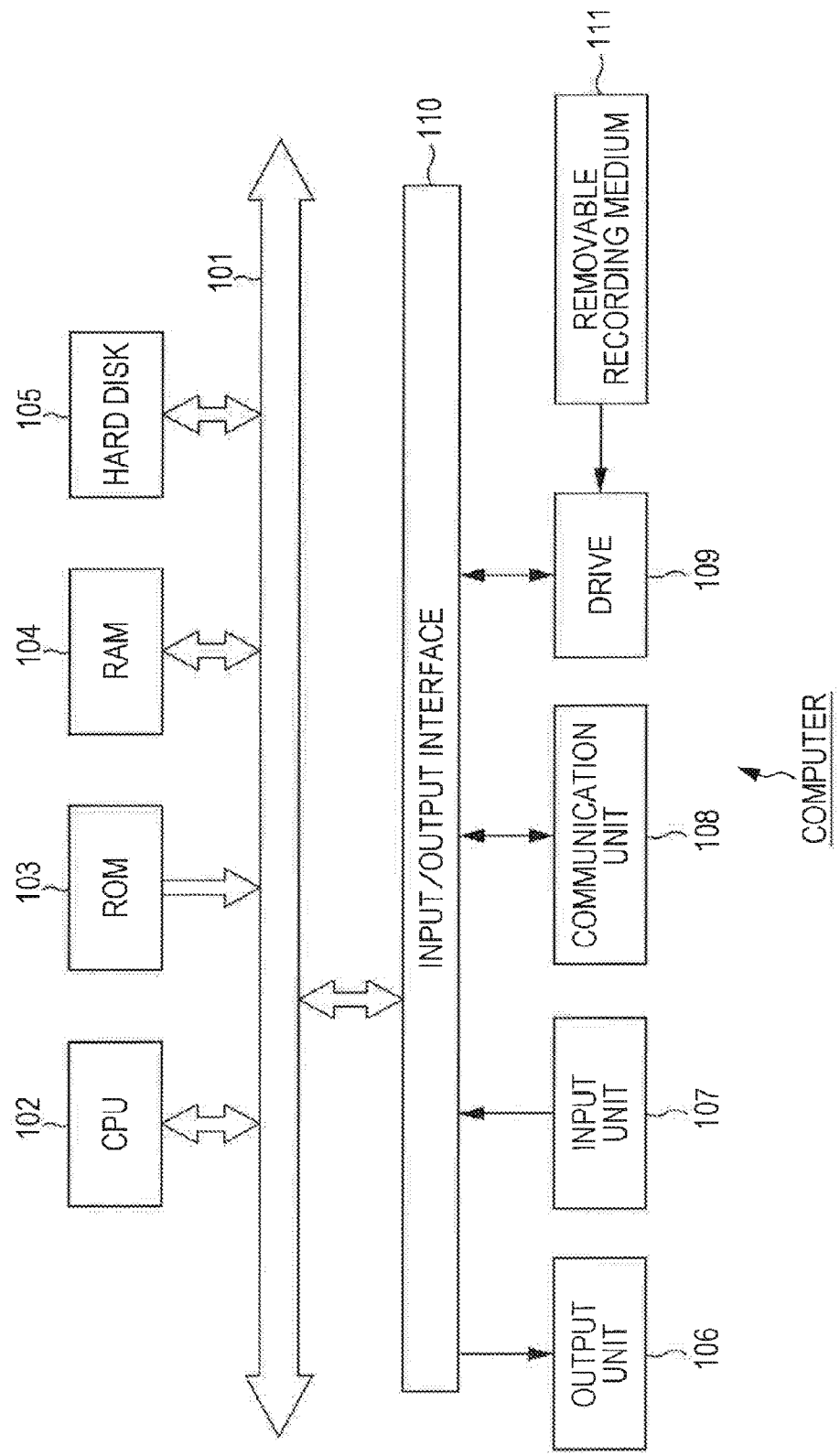

INFORMATION PROCESSING APPARATUS, INFORMATION PROCESSING METHOD, PROGRAM, AND INFORMATION PROCESSING SYSTEM

CROSS REFERENCE TO PRIOR APPLICATION

This application is a continuation of U.S. patent application Ser. No. 14/385,381 (filed on Sep. 15, 2014), which is a National Stage Patent Application of PCT International Patent Application No. PCT/JP2013/002502 (filed on Apr. 12, 2013) under 35 U.S.C. § 371, which claims priority to Japanese Patent Application No. 2012-095497 (filed on Apr. 19, 2012), which are all hereby incorporated by reference in their entirety.

TECHNICAL FIELD

The present disclosure relates to an information processing apparatus, an information processing method, a program, and an information processing system, and, in particular, to an information processing apparatus, an information processing method, a program, and an information processing system which can improve, for example, operability.

BACKGROUND ART

For example, the remote operation of an electronic device, such as a Television receiver (TV), is performed by transmitting a command from a remote commander to the TV in such a way as to press a button of the remote commander which is provided with channel buttons and volume buttons.

Meanwhile, in recent years, in order to support various operations, such as the operation of a browser on a display screen of the TV and the like, a remote commander which is provided with a touch sensor for detecting a touch on an operation surface of a touch pad, a touch panel, or the like has been proposed.

Further, applications have increased which are used to enable a remote operation of an electronic device by performing a touch operation using an apparatus which is provided with a touch sensor like a smart phone.

Operation systems which operate an electronic device other than the TV using the touch sensor which detects the operation performed by a user on the operation surface can be largely divided into two types, that is, first and second operation systems.

The first operation system is, like the touch pad which is provided on a so-called notebook Personal Computer (PC) or the like, an operation system which moves a pointer (a cursor) which is displayed on a display screen using, so to speak, a "relative position" operation which is the same as a mouse operation, and operates a Graphical User Interface (GUI) or the like which is arranged on the display screen.

In the first operation system, a pointer is moved according to a relative position which is touched on the operation surface with reference to a position on the operation surface at which a touch is started. Therefore, the pointer is not necessarily displayed at the same position even when the same position on the operation surface is touched.

The second operation system is an operation system (for example, refer to PTL 1) which associates each point (each position) (coordinates) on the operation surface of the touch pad or the like which is operated by a user with each point (each position) (coordinates) on the display screen of the TV or the like in a one to one correspondence and operates a pointer which moves according to an "absolute position" on the operation surface of a touch pad.

In the second operation system, each point on the operation surface has a one to one correspondence with each point on the display screen. Therefore, if the same position on the operation surface is touched, the pointer is displayed at the same position.

Meanwhile, in order to enable multi-touch which has become popular recently, the second operation system is necessary to maintain the positional relationship between respective touch points when the operation surface is touched by a plurality of fingers.

In the first operation system, a pointer is displayed on the display screen regardless of whether a user touches the operation surface of the touch pad. However, in the second operation system, for example, when the user touches the operation surface, a pointer is displayed at a position on the display screen which corresponds to the touched point (touch point).

Therefore, in the second operation system, when the user releases the touch from the operation surface (when a finger is taken away), the pointer which has been displayed on the display screen is eliminated.

In the above-described second operation system, for example, it may be possible to display a pointer on the display screen respectively according to an operation performed on the operation surface by a finger of the left hand (a left-hand finger) and an operation performed on the operation surface by a finger of the right hand (a right-hand finger), and thus it may be possible to perform operation by using both hands.

Therefore, according to the second operation system, when an On Screen Keyboard (OSK) is operated, it may be possible to rapidly perform the selection of a key, the selection of a predictive candidate, or the like.

CITATION LIST

Patent Literature

PTL 1: Japanese Unexamined Patent Application Publication No. 2009-253773

SUMMARY OF INVENTION

Technical Problem

The history of an operation system using a touch sensor is as yet short, and there is room for improvement in operability.

The present disclosure has been made in consideration of at least the above situation, and it is desirable to enable operability to be improved.

Solution to Problem

An information processing apparatus according to a first embodiment of the present disclosure includes: a mapping unit that performs a mapping which associates a position on an operation surface which is operated by a user with a position on a display screen on which an image is displayed based on graphics which are displayed on the display screen; and a detection unit that detects a correspondence point which is a position on the display screen and corresponds to the position on the operation surface which is operated by the user based on a result of the mapping. Furthermore, an information processing program according to the first embodiment of the present disclosure may cause a computer to function as the information processing apparatus.

An information processing method according to the first embodiment of the present disclosure may include: performing a mapping which associates a position on an operation surface which is operated by a user with a position on a display screen on which an image is displayed based on graphics which are displayed on the display screen; and detecting a correspondence point which is a position on the display screen and corresponds to the position on the operation surface which is operated by the user based on a result of the mapping.

An information processing system according to a second embodiment of the present disclosure may include: a terminal that includes the operation surface which is operated by a user; and an information processing apparatus which performs a process according to an operation of the operation surface. The information processing apparatus may include a mapping unit that performs a mapping which associates a position on the operation surface with a position on a display screen on which an image is displayed based on graphics which are displayed on the display screen; and a detection unit that detects a correspondence point which is a position on the display screen and corresponds to the position on the operation surface which is operated by the user based on a result of the mapping.

According to the above-described first and second embodiments, mapping, which associates the position on the operation surface which is operated by the user with the position on the display screen on which an image is displayed, may be performed based on graphics which are displayed on the display screen, and a correspondence point which is a position on the display screen, which corresponds to the position on the operation surface which is operated by the user, may be detected based on the result of the mapping.

Meanwhile, the information processing apparatus according to embodiments may be an independent apparatus and may be an internal block which configures a single apparatus.

In addition, it is possible to provide the program by transmitting the program via a transmission medium or by recording the program on the recording medium.

An information processing apparatus according to further embodiments of the present disclosure includes an operation surface configured to receive touch inputs, and a sensor unit configured to detect at least one right-side touch input from a manipulation by a user of the operation surface within a first operational area of the operation surface, and at least one left-side touch input from a manipulation by the user of the operation surface within a second operational area of the operation surface, wherein the first operational area and the second operational area of the operation surface are mapped to a graphical user interface (GUI) area of a display device.

An information processing method according to further embodiments of the present disclosure includes mapping a first operational area and a second operational area of an operation surface of a terminal device to a graphical user interface (GUI) area of a display device, detecting at least one right-side touch input from a manipulation by a user of the operation surface within the first operational area of the operation surface, and detecting at least one left-side touch input from a manipulation by the user of the operation surface within the second operational area of the operation surface.

A non-transitory computer-readable medium according to further embodiments of the present disclosure is embodied with a program, which when executed by a computer, causes the computer to perform a method including mapping a first operational area and a second operational area of an operation surface of a terminal device to a graphical user interface (GUI) area of a display device, detecting at least one right-side touch input from a manipulation by a user of the operation surface within the first operational area of the operation surface, and detecting at least one left-side touch input from a manipulation by the user of the operation surface within the second operational area of the operation surface.

Advantageous Effects of Invention

According to embodiments of the present disclosure, it is possible to improve the operability.

BRIEF DESCRIPTION OF DRAWINGS

FIG. 18 is a view illustrating a display example of the operation surface as the touch screen of the terminal in accordance with an embodiment of the present disclosure.

FIG. 19 is a block diagram illustrating a configuration example of a computer in accordance with an embodiment of the present disclosure.

DESCRIPTION OF EMBODIMENTS

<Information Processing System According to Embodiments>

Figure 1:
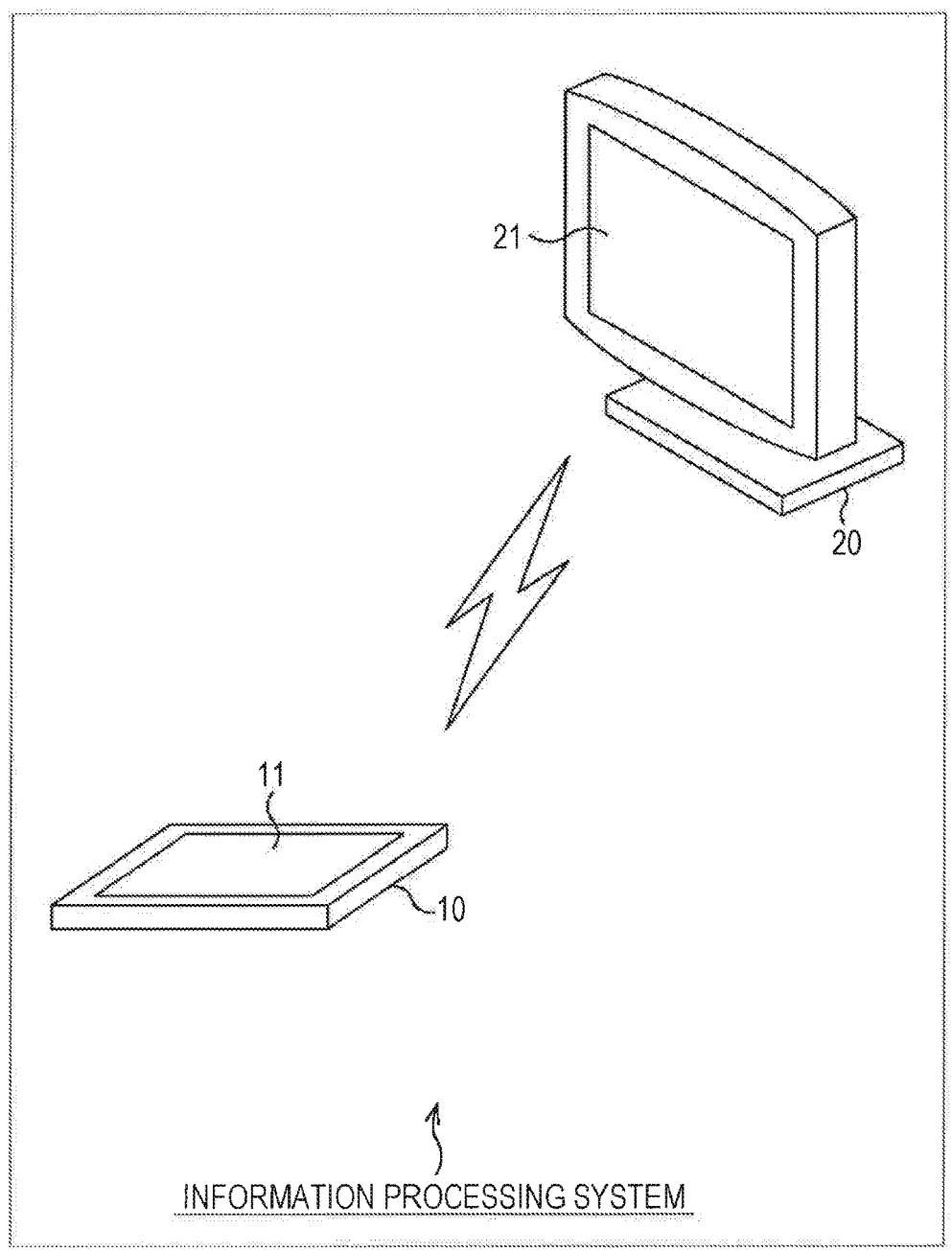
FIG. 1 is a perspective view illustrating a configuration example of an information processing system in accordance with an embodiment of the present disclosure.

FIG. 1 is a perspective view illustrating a configuration example of an information processing system in accordance with an embodiment of the present disclosure.

In FIG. 1, an information processing system includes a terminal 10 and a TV 20.

The terminal 10 is, for example, a tablet terminal such as a smart phone or the like or a remote commander which performs remote operation on an electronic device, and functions as the remote commander which performs the remote operation on the TV 20 in FIG. 1.

The terminal 10 includes an operation surface 11 which has a rectangular shape and is operated by a user, and transmits operation information which indicates the operation performed on the operation surface 11 by the user to the TV 20.

The TV 20 has a display screen 21 which has a rectangular shape and displays an image, and displays the images of content, such as a television broadcast program, a program which is recorded by a recorder (not shown), a program which is recorded in a built-in recording medium (not shown), or the like.

In addition, the TV 20 displays a Graphic User Interface (GUI), that is, for example, graphics of a browser or the like, on the display screen 21.

Further, the TV 20 receives operation information which is transmitted from the terminal 10, and performs a process, such as selection of a channel (e.g., channel tuning), increase or decrease in volume, display of a menu, a process corresponding to a GUI such as the browser of the like, in accordance with the operation information.

In the information processing system which is configured as described above, the operation information which includes information indicative of a touch point, such as the coordinates of a position (e.g., a touch point) on the operation surface 11 which is touched by a user in the terminal 10, is transmitted to the TV 20.

In the TV 20, a correspondence point which is a position on the display screen 21 corresponding to the touch point is detected based on the operation information from the terminal 10, and a process according to the correspondence point is performed.

Figure 2:
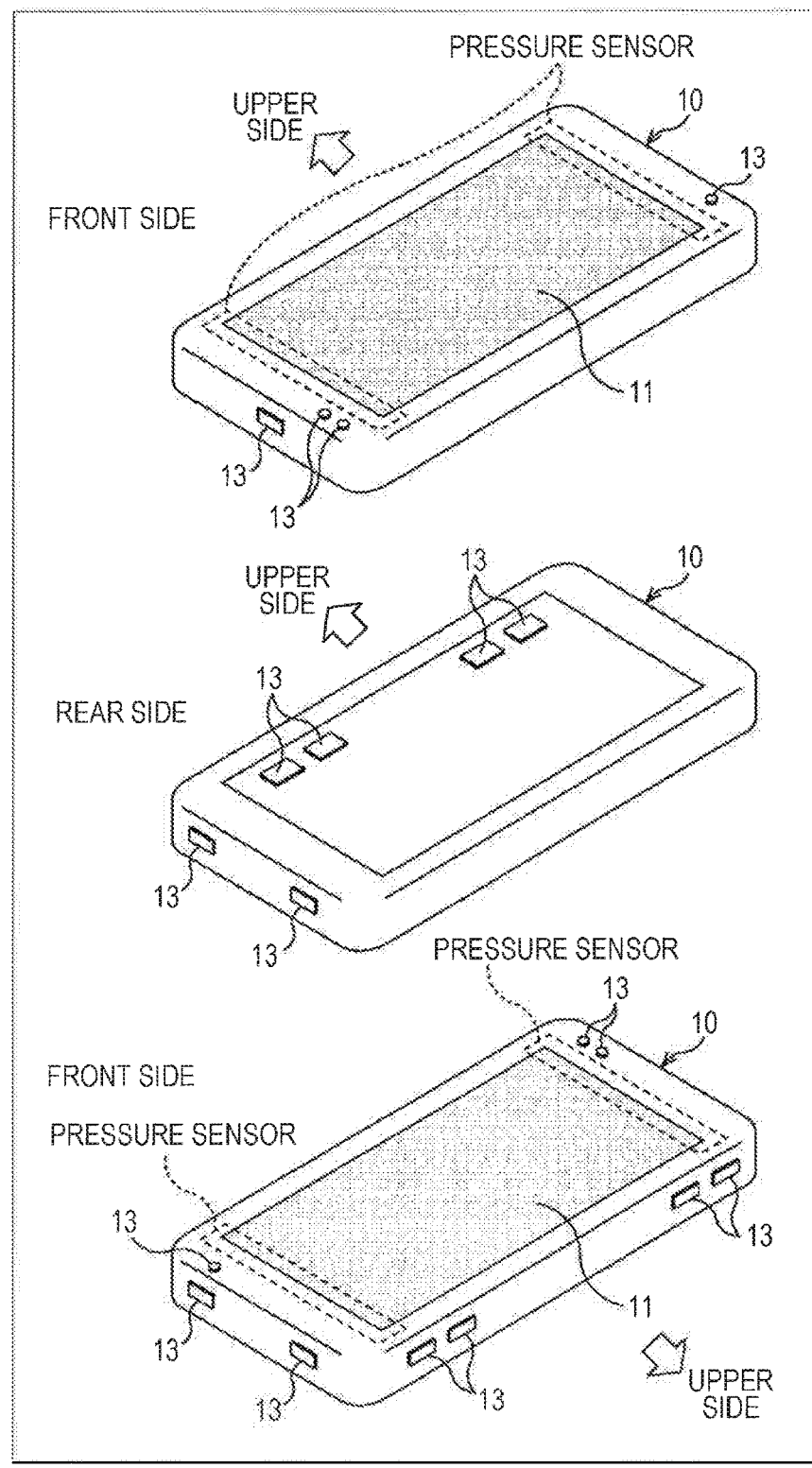
FIG. 2 is a perspective view illustrating a configuration example of a terminal in accordance with an embodiment of the present disclosure.

FIG. 2 is a perspective view illustrating a configuration example of a terminal 10 in FIG. 1, in accordance with an embodiment of the present disclosure.

The terminal 10 has a planar shape, and is provided with the operation surface 11, which is operated by the user and has a rectangular shape, on one surface thereof.

Here, a surface of the terminal 10 on which the operation surface 11 is provided is referred to as a front surface (e.g., superficial surface) of the terminal 10.

In addition, when the longer direction of the operation surface 11 which has the rectangular shape is horizontally arranged, one of two long sides in a rectangle as the operation surface 11 is referred to as an upper side of the terminal 10.

The terminal 10 includes, for example, a built-in set of an electrostatic (e.g., electrostatic capacitance) type touch panel or a touch pad, a light source which emits light, and a sensor which receives reflection light from an object, and has a function of receiving (e.g., detecting) input (e.g., approach and contact) to the operation surface 11 from the outside.

If an object from the outside, that is, for example, a finger of the user or a touch pen which is used by the user approaches or comes into contact with (e.g., touches) the operation surface 11, the terminal 10 transmits the operation information which includes positional information indicative of the position approached or contacted.

Hereinafter, although the description primarily discusses the coming into contact by the finger of the user or a touch pen with the operation surface 11, embodiments of the disclosure also contemplate the approach by the finger of the user or a touch pen to the operation surface 11 in addition to or in lieu thereof.

As the positional information indicative of a position (e.g., touch point) with which a finger of the user comes into contact, it is possible to use information which can specify a touch point on the operation surface 11 with which a finger comes into contact, for example, such as coordinates of the touch point on the operation surface 11, information indicative of the degree of contact with regard to each point of the operation surface 11 (for example, distribution of electrostatic capacitance of the operation surface 11 when the operation surface 11 is configured by an electrostatic touch panel or the like).

In addition, in the terminal 10, as a coordinate system of the positional information indicative of the touch point, it is possible to use, for example, a fixed 2-dimensional coordinate system in which a direction upward from the terminal 10 (indicated using a white-spaced arrow in FIG. 2) is set to a y axis, the vertical direction of the operation surface 11 is set to an x axis, and a predetermined point on a 2-dimensional plane which includes the operation surface 11 is set to the origin.

Further, in the terminal 10, it is possible to detect the posture of the terminal 10 when the user holds the terminal 10, and to use a variable 2-dimensional coordinate system according to the posture of the terminal 10 as the coordinate system of the positional information of the touch point, based on, for example, the shadow of a finger of the user on the operation surface 11 (e.g., shadow which appears when a finger of the user is vertically projected on the operation surface 11), a gravity sensor, or the like.

That is, in the terminal 10, it is possible to use the variable 2-dimensional coordinate system which varies according to the posture of the terminal 10, in which the vertical direction of the operation surface 11 is set to a y axis, the horizontal direction thereof is set to an x axis, and a predetermined point on the operation surface 11 is set to the origin when the user holds the terminal 10, as the coordinate system of the positional information of the touch point.

Meanwhile, as described above, in the TV 20, the correspondence point on the display screen 21 which corresponds to the touch point is detected based on the operation information from the terminal 10. However, when the size of the operation surface 11 (for example, the minimum value and the maximum value of each of an x-coordinate and a y-coordinate) is necessary in addition to the positional information in order to detect the correspondence point, the operation information which is transmitted from the terminal 10 to the TV 20 also includes information, such as the size of the operation surface 11, which is necessary to detect the correspondence point, in addition to the positional information if necessary.

Hereinafter, for ease of explanation given as an example, if not otherwise specified, the user causes the opposite side (e.g., lower side) of the upper side of the terminal 10 to face a position which is near the user, and operates the operation surface 11 using a finger of a right or left hand in a state in which the end portion of the terminal 10 (e.g., the operation surface 11) in the longer direction is grasped by the right or left hand (hereinafter, called a "standard state") such that the user can see the operation surface 11. However, the present disclosure is not limited thereto.

The operation which is performed on the terminal 10 by the user largely includes an operation (e.g., pointing) which is performed to select a button or the like on the GUI displayed on the display screen 21 of the TV 20, and a determination operation which is performed to determine (e.g. confirm) the selection.

As shown in FIG. 2, physical buttons 13 are provided on the front surface, the rear surface (e.g., of the opposite side surface to the front surface), and the side surface of the terminal 10 if necessary. Therefore, in the terminal 10, it is possible to allocate, for example, the operations of the buttons 13 which are provided on the side surface of the terminal 10 to the determination operation.

That is, for example, when the user holds the terminal 10 in the standard state, it is possible to easily operate switches 13 which are provided on the left side surface of the upper side of the terminal 10 using an index finger or the like of the left hand, and it is possible to easily operate the switches 13 which are provided on the right side surface of the upper side of the terminal 10 using a right-hand index finger.

Here, it is possible to allocate the operation of the switches 13 which are provided on the left side surface of the upper side of the terminal 10 to the determination operation which is performed to determine a selection performed by the operation on the operation surface 11 using a finger of a left hand. In the same manner, it is possible to allocate the operation of the switches 13 which are provided on the right side surface of the upper side of the terminal 10 to the determination operation which is performed to determine the selection performed by the operation on the operation surface 11 using a finger of a right hand.

In addition, in the terminal 10, for example, it is possible to allocate a release operation which takes away a finger which is in contact with the operation surface 11 from the operation surface 11 to a determination operation.

That is, it is possible to allocate an operation, which takes away a left-hand finger which is in contact with the operation surface 11, to a determination operation in order to determine a selection which is performed, immediately therebefore, by an operation (e.g., contact) on the operation surface 11 using a left-hand finger. In the same manner, it is possible to allocate the operation, which takes away a right-hand finger which is in contact with the operation surface 11, to a determination operation in order to determine a selection which is performed, immediately therebefore, by an operation on the operation surface 11 using a right-hand finger.

Further, in the terminal 10, for example, it is possible to allocate a pressing operation which presses the operation surface 11 using a finger which comes into contact with the operation surface 11 to the determination operation.

In the terminal 10, with regard to the pressing operation performed on the operation surface 11, for example, as shown in FIG. 2, pressure (e.g., load) sensors which detect a pressure pressing the operation surface 11 are provided on the respective end portions of the right and left (e.g., the longer direction) of the operation surface 11, and it is possible to detect whether or not the pressing operation is performed using either a left-hand finger or a right-hand finger of the user based on pressures detected by the respective pressure sensors.

More specifically, it is possible to calculate the pressing power of the respective touch points of a left-hand finger and a right-hand finger of the user using the pressures which are output from the respective right and left pressure sensors on the operation surface 11 and (e.g., the coordinates of) the touch points of a left-hand finger and a right-hand finger on the operation surface 11, and it is possible to determine whether or not the pressing operation is performed on a touch point, at which the pressing power is greater than a predetermined threshold value, as the determination operation. Otherwise, it is possible to determine whether or not the pressing operation is performed on a touch point of a left-hand finger or a right-hand finger of the user as the determination operation, based on, for example, a ratio of pressures which are output from the respective right and left pressure sensors on the operation surface 11.

Meanwhile, the positions at which the pressure sensors are provided are not limited to the right and left end portions of the operation surface 11. Alternatively, only a single pressure sensor may be provided, or three or more pressure sensors may be provided.

In addition, in the terminal 10, with regard to the pressing operation performed on the operation surface 11, for example, the operation surface 11 is configured such that the operation surface 11 can be pressed (e.g., the inside thereof can be pressed), and click switches which detect that the operation surface 11 is pressed are provided on the right and left end portions of the operation surface 11. It is possible to detect whether or not the pressing operation is performed using either a left-hand finger or a right-hand finger of the user based on the on and off states of each of the click switches.

In addition, in the terminal 10, with regard to the pressing operation performed on the operation surface 11, for example, the operation surface 11 is configured such that the operation surface 11 can be pressed, the operation surface 11 is configured with an electrostatic touch-pad or the like, and a single click switch which detects the press of the operation surface 11 is provided. It is possible to detect whether or not the pressing operation is performed using either a left-hand finger or a right-hand finger of the user based on variations in the electrostatic capacitance of the operation surface 11 when the click switch is in an on state.

Further, in the terminal 10, with regard to the pressing operation performed on the operation surface 11, for example, the operation surface 11 is configured with an electrostatic touch-pad or the like. It is possible to detect the press of the operation surface 11 and a fact that the press is performed by an operation using any of a left-hand finger and a right-hand finger of the user based on variation in the electrostatic capacitance of the operation surface 11.

In addition, when it is possible to operate the operation surface 11 by the approach of a finger or the like of the user, it is possible to allocate the contact with (e.g., touch on) the operation surface to the determination operation.

Figure 3:
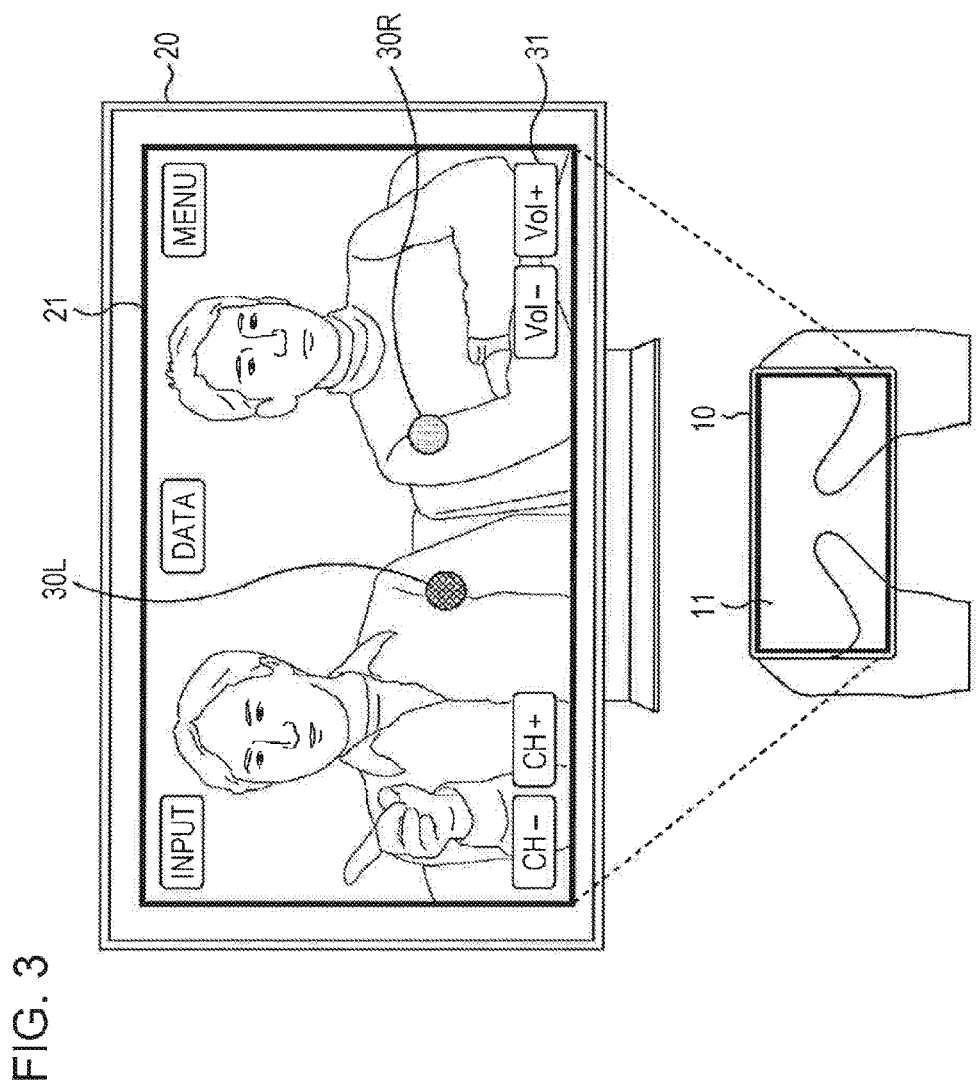
FIG. 3 is a view illustrating the outline of a process of the information processing system in accordance with an embodiment of the present disclosure.

FIG. 3 is a view illustrating the outline of a process of the information processing system in FIG. 1, in accordance with an embodiment of the present disclosure.

In FIG. 3, in the TV 20, the image of a program (e.g., a program image) is displayed on a display screen 21, and, further, an icon 31 which configures the GUI is overlapped with the program image and displayed.

Here, the icon 31 functions as various types of buttons (e.g., virtual buttons) such as a volume button which adjusts volume, a music selection button which selects a channel, and the like.

The terminal 10, for example, regularly, or irregularly, when the operation state of the terminal 10 is varied or the like, transmits the operation information to the TV 20.

The TV 20 recognizes (e.g., detects) the operation state of the terminal 10 based on the operation information from the terminal 10, and when a left-hand finger of the user touches the operation surface 11 of the terminal 10, the TV 20 displays a pointer 30L as a symbol image which indicates that a left-hand finger touches a correspondence point (hereinafter, referred to as a left correspondence point) on the display screen 21 which corresponds to the touch point (hereinafter, referred to as a left touch point) of the operation surface 11 which is touched by the left-hand finger.

In a similar manner, when the operation surface 11 of the terminal 10 is touched by the right-hand finger of the user, the TV 20 displays a pointer 30R as a symbol image which indicates that the right-hand finger touches a correspondence point (hereinafter, referred to as a right correspondence point) on the display screen 21 which corresponds to the touch point (hereinafter, referred to as a right touch point) of the operation surface 11 which is touched by the right-hand finger.

It is possible to display the pointers 30L and 30R such that the user easily distinguishes the respective pointers in such a way as to change a display format such as a color, a pattern, a shape, or the like.

In addition, in FIG. 3, circular graphics are used as a pointer 30L which indicates (e.g., the touch of) a left-hand finger. However, it is possible to use, for example, an arrow-shaped graphics, graphics in a shape of the left-hand finger which is in contact with the operation surface 11, graphics in the shape of the left-hand finger which expresses the degree of contact (e.g., approach) of the left-hand finger with the operation surface 11 using shades or colors, or the like, as the pointer 30L in addition to the circular graphics. The pointer 30R which indicates (e.g., the touch of) the right-hand finger, may be represented similarly.

If the user brings a finger (e.g., a left-hand finger or a right-hand finger) of the user into contact with the operation surface 11, the pointer 30L or 30R is displayed at a correspondence point on the display screen 21 which corresponds to the touch point on the operation surface 11 which is touched by a finger of the user.

When the user moves a finger which touches on the operation surface 11 while touching on the operation surface 11, the pointer 30L or 30R moves according to the movement of the finger of the user. In FIG. 3, the touch points on the operation surface 11 are in one to one correspondence with the correspondence points on the display screen 21, and the user can perform an operation at an interval which might be in contact with the display screen 21.

When the pointer 30L or 30R is moved, for example, onto a desired icon 31 in such a way that the user moves the finger which touches on the operation surface 11 and the determination operation is performed in a state in which the pointer 30L or 30R is positioned on the icon 31 (e.g., is pointed), the terminal 10 transmits operation information indicative of the determination operation performed by the user to the TV 20.

When the TV 20 receives the operation information indicative of the determination operation, the TV 20 performs a process corresponding to the icon 31 on which the pointer 30L or 30R is positioned when the determination operation is performed, that is, for example, the adjustment of a volume or the selection of a channel.

<Configuration Examples of Terminal 10 and TV 20>

Figure 4:
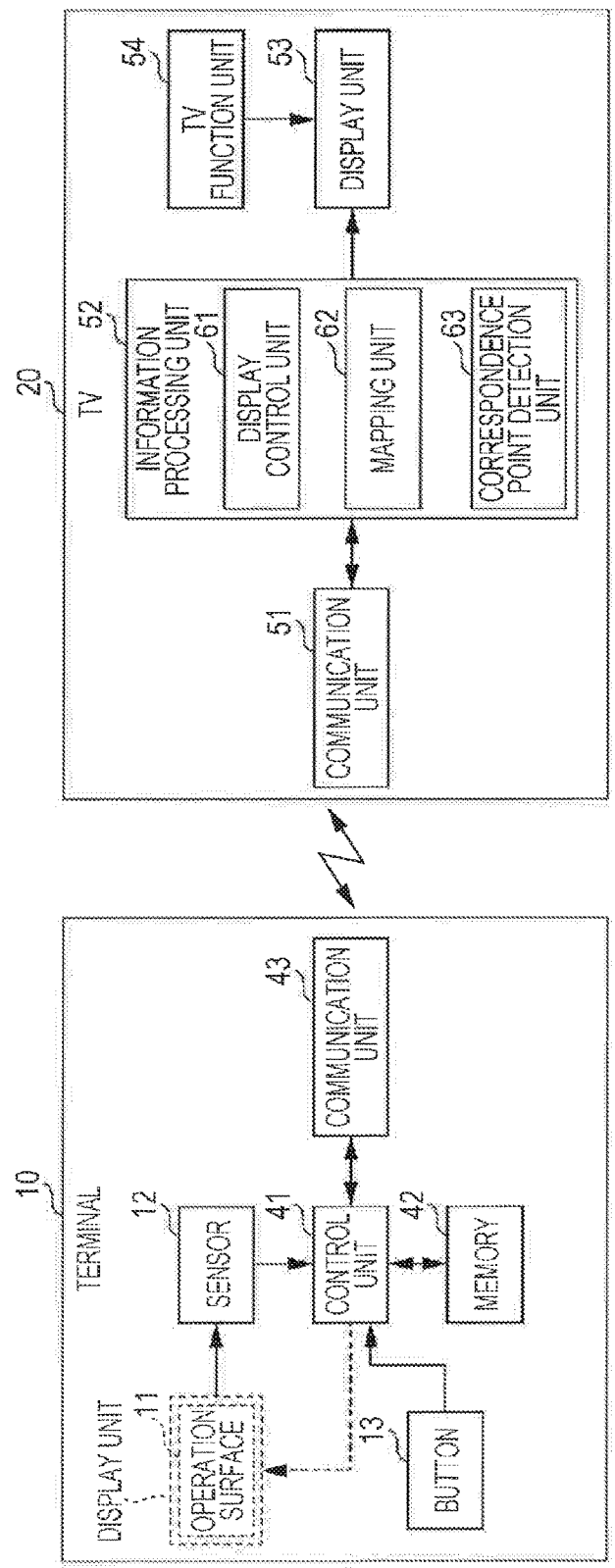
FIG. 4 is a block diagram illustrating configuration examples of the terminal and a TV in accordance with an embodiment of the present disclosure.

FIG. 4 is a block diagram illustrating configuration examples of a terminal 10 and a TV 20 in FIG. 1, in accordance with an embodiment of the present disclosure.

In FIG. 4, the terminal 10 includes an operation surface 11, a sensor 12, a button group 13, a control unit 41, a memory 42, and a communication unit 43.

The operation surface 11 is, for example, a rectangular-shaped surface which is operated by a user. The sensor 12 detects an operation performed on the operation surface 11, and supplies detection information indicative of the result of detection to the control unit 41.

Meanwhile, the sensor 12 includes a necessary sensor such as the pressure sensor described in FIG. 2 when necessary in addition to a touch sensor such as a touch-pad or a touch panel.

In addition, the operation surface 11 is a part of the touch sensor.

Further, when a touch panel which has a transparent operation surface 11 is used as the touch sensor, it is possible to integrally configure the operation surface 11 and a display unit, such as a liquid crystal panel or the like, in a single body. In this case, the operation surface 11 displays an image, and functions as a touch screen which can receive an input for the image. A necessary image, such as a GUI or the like, is displayed on the display unit which configures the touch screen, under the control of the control unit 41.

The button 13 is a physical button described in FIG. 2 which is provided on the side of the terminal 10, and operated by the user.

The control unit 41 controls each block which configures the terminal 10, and performs other necessary processes.

That is, the control unit 41 generates operation information indicative of an operation performed by the user with respect to the terminal 10 which includes the operation surface 11, based on the detection information from the sensor 12 or the operation of the button 13, and supplies the generated operation information to the communication unit 43. In addition, the control unit 41 performs a necessary process according to the information which is received by the communication unit 43.

The memory 42 stores data (e.g., information) which is necessary for the operation of the control unit 41.

The communication unit 43 performs communication in a wireless manner (e.g., wireless communication), for example, such as wireless Local Area Network (LAN), IEEE 802.15 (so-called Bluetooth (registered trademark)), infrared rays, or the like.

That is, the communication unit 43 transmits the operation information from the control unit 41 to the TV 51.

In addition, the communication unit 43 receives information which is wirelessly transmitted from the TV 20 or the like, and supplies the information to the control unit 41.

The TV 20 includes a communication unit 51, an information processing unit 52, a display unit 53, and a TV function unit 54.

The communication unit 51 performs wireless communication like the communication unit 43.

That is, the communication unit 51 transmits information which is supplied from the information processing unit 52 or the like. In addition, the communication unit 51 receives the operation information which is transmitted from (e.g., the communication unit 43 of) the terminal 10, and supplies the operation information to the information processing unit 52.

The information processing unit 52 performs various types of information (e.g., signal) processes in order to remotely operate the TV 20 with the terminal 10 using the operation information which is supplied from the communication unit 51.

That is, the information processing unit 52 includes a display control unit 61, a mapping unit 62, and a correspondence point detection 63.

The display control unit 61 performs display control which displays an image on the display unit 53.

That is, the display control unit 61, for example, generates and acquires a GUI such as a browser, an OSK, or the like, and displays the GUI on the display unit 53. In addition, the display control unit 61, for example, displays the pointer 30L or 30R on the display unit 53 as a symbol image, which indicates that the operation surface 11 of the terminal 10 is touched, at a correspondence point on the display screen 21 of the display unit 53 which is detected by the correspondence point detection unit 63.

The mapping unit 62 performs a mapping which associates a position on the operation surface 11 of the terminal 10 with a position on the display screen 21 of the display unit 53, based on a GUI which is displayed on the display unit 53.

The correspondence point detection unit 63 detects a correspondence point on the display screen 21 of the display unit 53 which corresponds to the touch point on the operation surface 11 which is touched by the user, and which is recognized using the operation information from the communication unit 51, based on the result of mapping performed by the mapping unit 62.

The display unit 53 is, for example, a display panel which includes the display screen 21 such as a liquid crystal panel, an organic Electro Luminescence (EL) panel, or the like, and displays the GUI, the pointer 30L or 30R, or the like on the display screen 21 under the control of the display control unit 61.

In addition, the display unit 53 displays an image which is supplied from the TV function unit 54.

The TV function unit 54 is a program which causes the TV 20 to function as a TV, and performs, for example, the reception of a television broadcast program, the recording of the content of a television broadcast program or the like, the reproduction of the recorded content, or the like.

The television broadcast program which is received using the TV function unit 54 or the image of the reproduced content is supplied from the TV function unit 54 to the display unit 53, and displayed on the display screen 21.

Figure 5:
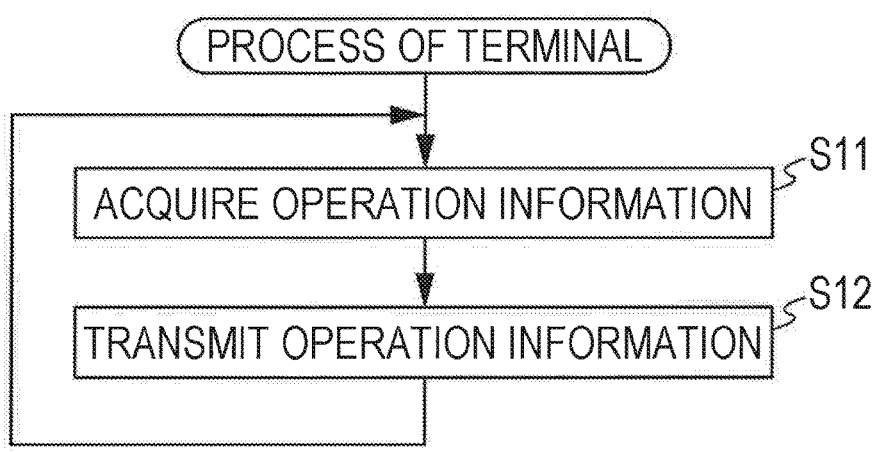
FIG. 5 is a flowchart illustrating a process of the terminal in accordance with an embodiment of the present disclosure.

FIG. 5 is a flowchart illustrating a process of the terminal 10 in FIG. 4, in accordance with an embodiment of the present disclosure.

The control unit 41 generates and acquires the operation information according to the output of the sensor 12 or the operation of the button 13, and supplies the operation information to the communication unit 43 in step S11. The process proceeds to step S12.

In step S12, the communication unit 43 transmits the operation information from the control unit 43. Thereafter, the process returns from step S12 to step S11. Hereinafter, the same process is repeated.

Figure 6:
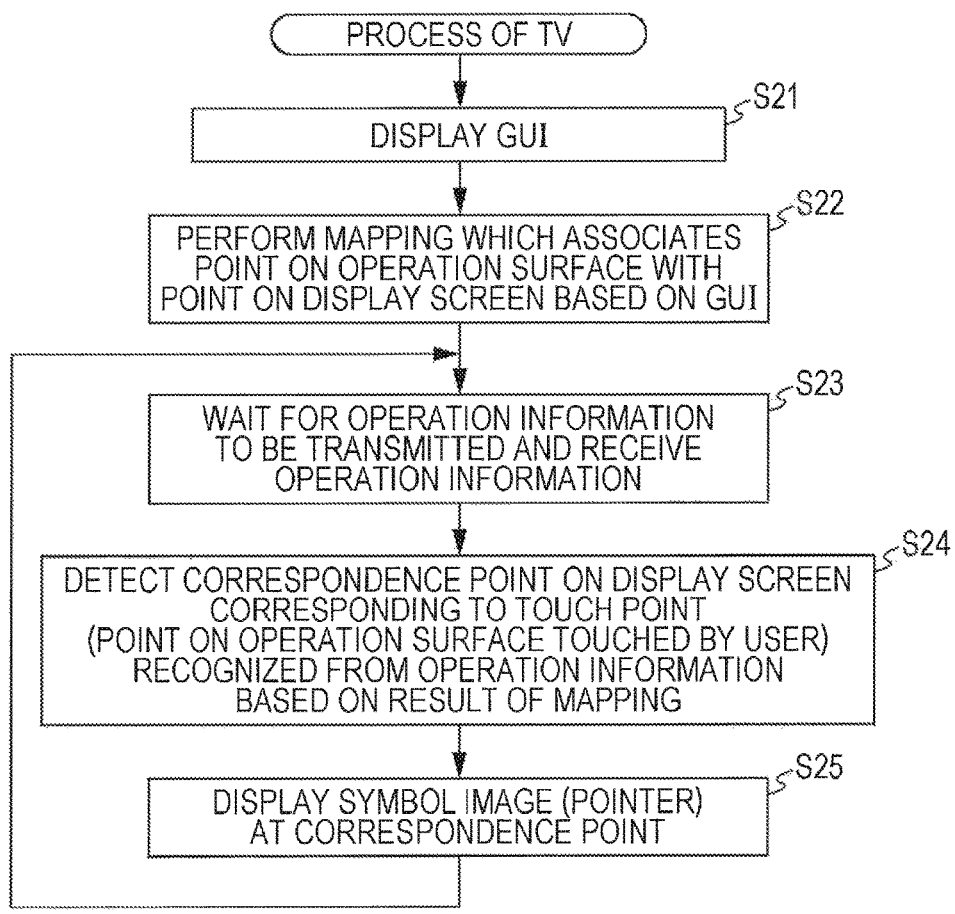
FIG. 6 is a flowchart illustrating a process of the TV in accordance with an embodiment of the present disclosure.

FIG. 6 is a flowchart illustrating a process of the TV 20 in FIG. 4, in accordance with an embodiment of the present disclosure.

In step S21, the display control unit 61 generates a GUI according to an event other than the operation performed by the user, supplies the GUI to the display unit 53, and displays the GUI on the display screen 21. The process proceeds to step S22.

In step S22, the mapping unit 62 performs a mapping which associates a position on the operation surface 11 of the terminal 10 with a position on the display screen 21 of the display unit 53 based on the GUI which is displayed on the display screen 21. The process proceeds to step S23.

In step S23, the communication unit 51 waits for the operation information to be transmitted from the terminal 10, receives the operation information, and supplies the operation information to the information processing unit 52. The process proceeds to step S24.

In step S24, the correspondence point detection unit 63 of the information processing unit 52 detects the correspondence point on the display screen 21 of the display unit 53, which is recognized using the operation information from the communication unit 51 and which corresponds to the touch point on the operation surface 11 touched by the user, based on the result of mapping which is performed immediately before by mapping unit 62. The process proceeds to step S25.

In step S25, the display control unit 61 displays the pointer 30L or 30R at the correspondence point on the display screen 21 of the display unit 53 which is detected by the correspondence point detection unit 63. The process returns to step S23.

<Display Example of Display Screen 21>

Figure 7:
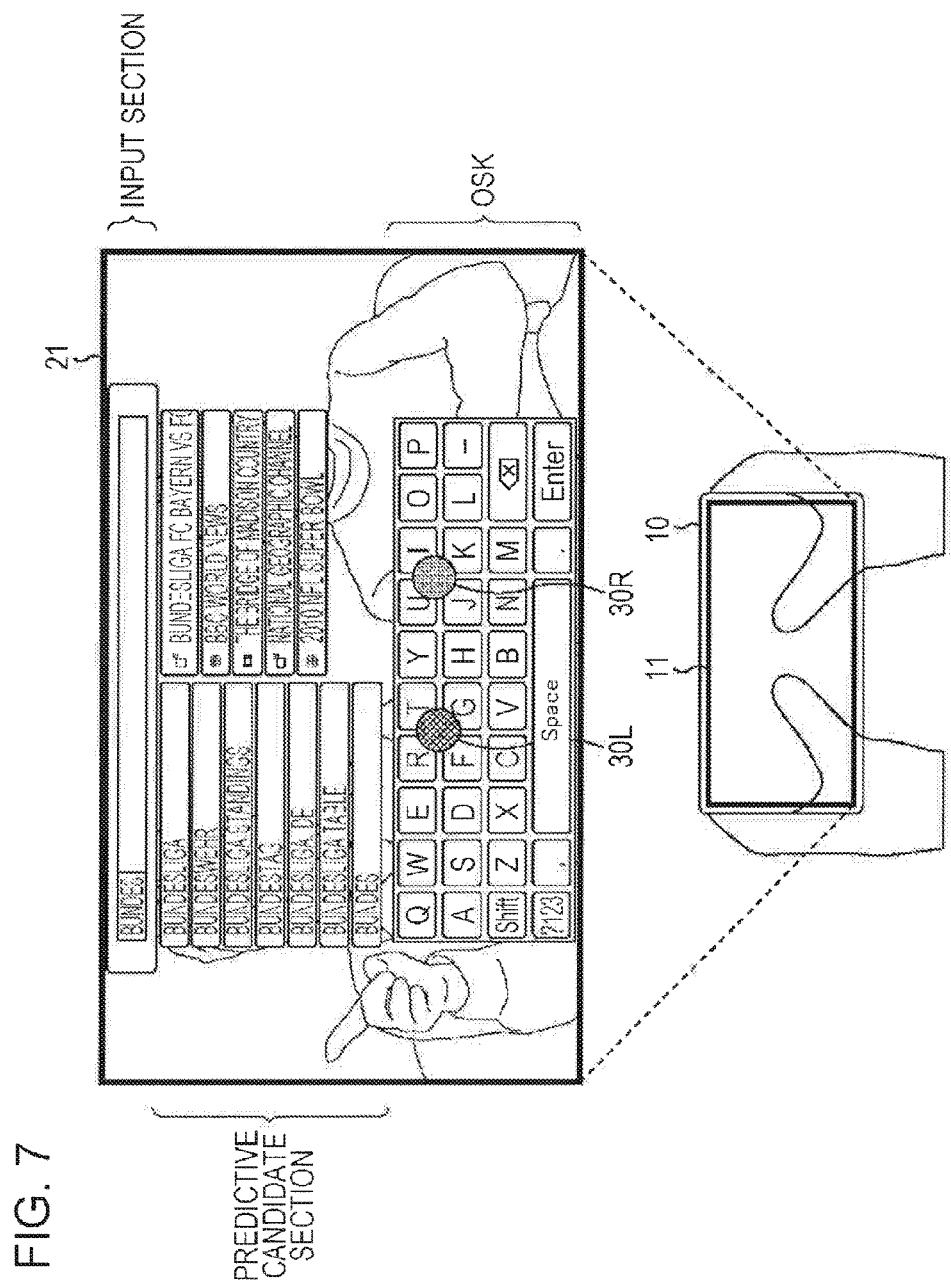
FIG. 7 is a view illustrating an example of a mapping which associates an operation surface 11 with a display screen, in accordance with an embodiment of the present disclosure.

FIG. 7 is a view illustrating an example of a mapping which associates (a position on) the operation surface 11 with (a position on) the display screen 21, in accordance with an embodiment of the present disclosure.

In FIG. 7, the mapping is performed such that the whole operation surface 11 equally corresponds to the whole display screen 21. Hereinafter, the mapping is appropriately referred to as a normal mapping.

Here, if it is assumed that the length H2 of the horizontal direction (e.g., lateral direction) of the display screen 21 is $kx$ ($=H2/H1$) times as large as the length H1 of the horizontal direction (e.g., longer direction) of the operation surface 11 and that the length V2 of the vertical direction (e.g., longitudinal direction) of the display screen 21 is $ky$ ($=V2/V1$) times as large as the length V1 of the vertical direction of the operation surface 11, points ($kx \times Xin, ky \times Yin$) are associated with touch points ($Xin,Yin$) (e.g., a point and/or position in which an x-coordinate is Xin and a y-coordinate is Yin) as a correspondence point ($Xout,Yout$) in the normal mapping.

Meanwhile, here, for brief explanation, for example, it assumed that the origin of the 2-dimensional coordinate system which defines the touch points ($Xin,Yin$) on the operation surface 11 is a lower left point (e.g., vertex) of the operation surface 11 and that the origin of the 2-dimensional coordinate system which defines the correspondence points ($Xout,Yout$) on the display screen 21 is the lower left point of the display screen 21.

FIG. 7 displays an input section which is used to input letter strings which are searched for on the web, a predictive candidate section in which the candidates of the letter strings, which are predicted to be input based on the letter (e.g., string) input to the input section, are displayed, and a GUI which uses an OSK as a GUI component (hereinafter, referred to as a search GUI).

In addition, in FIG. 7, the search GUI is displayed in a form in which the search GUI is overlapped with the image (e.g., the program image) of a television broadcast program.

Here, in FIG. 7, the predictive candidates are displayed in the predictive candidate section in such a way that the predictive candidates are divided into two columns on a left side and a right side. The left side predictive candidates are letter string candidates which are predicted to be input based on the letter (e.g., string) input in the input section. The right side predictive candidates are the candidate titles of content recorded in the TV 20, which are predicted to be searched for based on the letter (e.g., string) input in the input section.

Incidentally, in FIG. 7, the search GUI is semitransparent such that the program image is visible as much as possible. Further, in FIG. 7, the vertical length of the search GUI approximately coincides with the vertical length of the display screen 21. However, the horizontal width of the search GUI is shorter than the horizontal width of the display screen 21 by a certain margin such that the program image is visible as much as possible (such that the user easily confirms the program image as much as possible).

In addition, the search GUI is displayed in the center of the display screen 21, and thus the program image with which the search GUI is overlapped is displayed in a state in which the right and left portions thereof are clearly viewed.

Hereinafter, first to fourth mappings will be described as mappings which can improve the operability of the terminal 10 compared to the above-described normal mapping.

<First Mapping>

Figure 8:
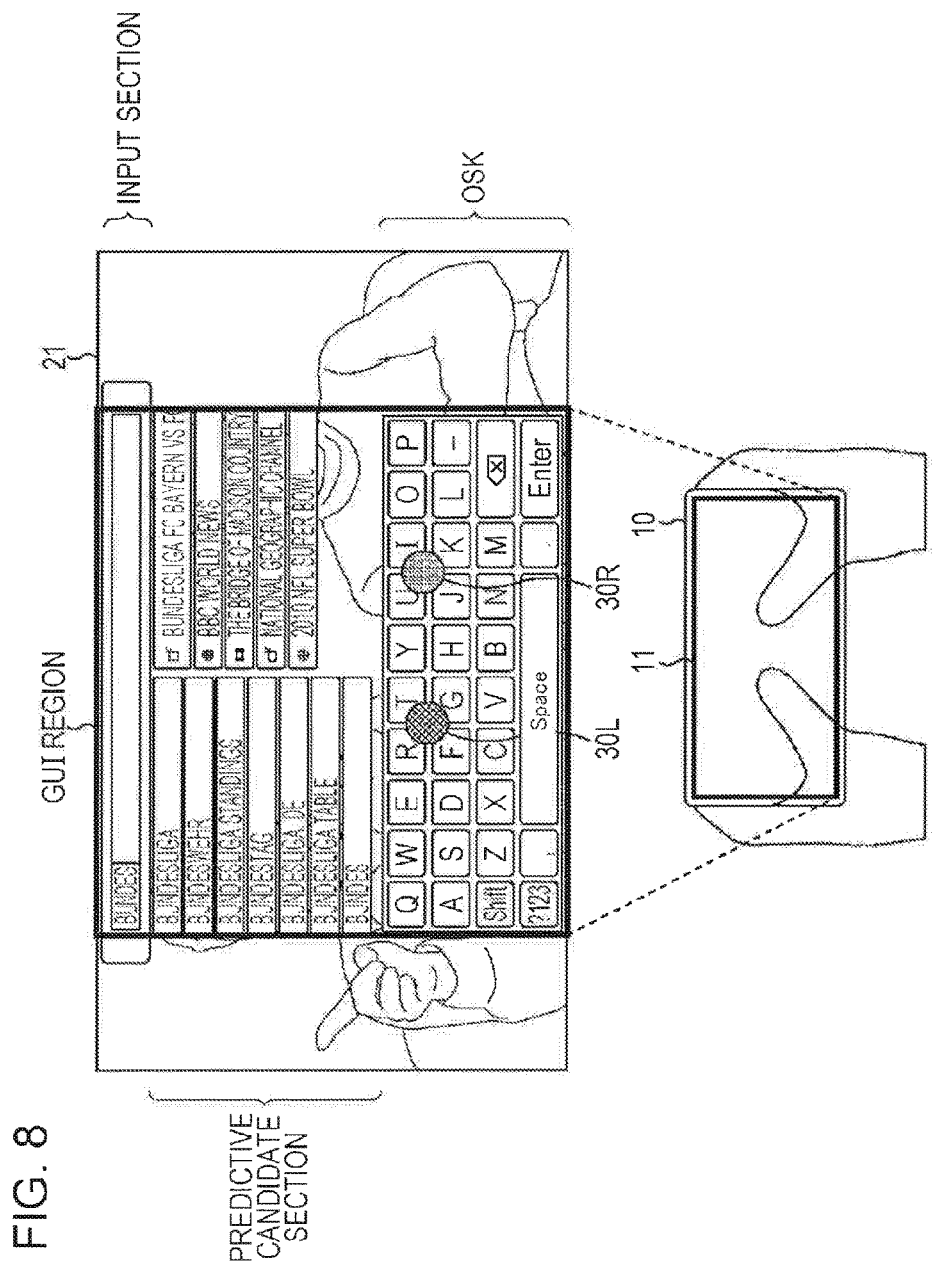
FIG. 8 is a view illustrating a first mapping in accordance with an embodiment of the present disclosure.

FIG. 8 is a view illustrating a first mapping which associates the operation surface 11 with the display screen 21, in accordance with an embodiment of the present disclosure.

In the normal mapping, regardless of the GUI which is displayed on the display screen 21, for example, the whole operation surface 11 is uniformly associated with the whole display screen 21 as described with reference to FIG. 7.

Therefore, in the normal mapping, in addition to the region of the display screen 21, on which the GUI is displayed (hereinafter, referred to as a GUI region), the user can operate (e.g., point) regions other than the GUI region (hereinafter, referred to as a non-GUI region).

Here, "operating a region on the display screen 21" means operating the operation surface 11 such that a correspondence point is positioned in the region.

As described above, in the normal mapping, the user can operate the non-GUI region. However, since the GUI is not displayed in the non-GUI region, it is not necessary to operate the non-GUI region.

Here, in the first mapping, the mapping unit 62 associates positions on the GUI regions (e.g., graphic regions) which display the GUIs in a position on the operation surface 11 and a position on the display screen 21, based on the GUI which is displayed on the display screen 21.

In FIG. 8, the mapping is performed such that the whole operation surface 11 is uniformly associated with the whole GUI region.

Here, the mapping which uniformly associates the whole (or a part of) operation surface 11 with the whole GUI region is referred to as a uniform mapping.

In the uniform mapping, if it is assumed that the length H2 of the horizontal direction of the GUI region is kx (=H2/H1) times as large as the length H1 of the horizontal direction of the operation surface 11 and that the length V2 of the vertical direction of the GUI region is ky (=V2/V1) times as large as the length V1 of the vertical direction of the operation surface 11, a position (Xin,Yin) on the operation surface 11 is associated with a position (kx×Xin,ky×Yin) on the GUI region.

Meanwhile, here, for brief explanation, for example, it is assumed that the GUI region is a rectangular-shaped region, the origin of the 2-dimensional coordinate system which defines positions (e.g., points) (Xin,Yin) on the operation surface 11 is the lower left point (e.g., vertex) of the operation surface 11, and the origin of the 2-dimensional coordinate system which defines positions (Xout,Yout) on the GUI region is the lower left point of the GUI region.

The GUI region is equal in size to the display screen 21 in its largest embodiment, and is often configured to be smaller than the display screen 21.

In FIG. 8, the search GUI which is described with reference to FIG. 7 is displayed. The search GUI is smaller than the display screen 21 as described with reference to FIG. 7.

Here, it is assumed that a region which has an arbitrary size of the display screen 21 is a unit region. According to the uniform mapping (e.g., the first mapping) which associates the whole operation surface 11 with the whole GUI region, a wider range on the operation surface 11 is associated with the unit region compared to the normal mapping which associates the whole operation surface 11 with the whole display screen 21.

That is, for example, as shown in FIG. 8, when an OSK is displayed in the display region 21, a wider range of the operation surface 11 is associated with (e.g., the display region of) each of the keys of the OSK according to the uniform mapping compared to the normal mapping.

As the result, compared to the case of the normal mapping, the user can operate the operation surface 11 with comparatively rough precision while sensing that each of the keys of the OSK becomes large, and thus it is possible to improve the operability of the terminal 10 (i.e., the operability of the OSK).

Here, in the uniform mapping, it is possible to reduce a region on the display screen 21 which can be set to be a correspondence point to the GUI region from the whole display screen 21, compared to the case of the normal mapping, according to the GUI displayed on the display screen 21.

Meanwhile, when a large GUI which is unlikely to be displayed on the display screen 21 is displayed, as a result, it is possible to associate the whole operation surface 11 with the whole display screen 21 in the uniform mapping in the same manner as the normal mapping. In addition thereto, it is possible to assume a virtual display screen in which the display screen 21 is enlarged such that the large GUI can be displayed, and to associate a GUI region obtained when the whole of the large GUI is displayed with the operation surface 11 on the virtual display screen.

In the uniform mapping, the GUI region, obtained when the whole of the large GUI is displayed on the virtual screen in which the display screen 21 is enlarged, is associated with the operation surface 11. Then, in the uniform mapping, compared to the case of the normal mapping, it is possible to enlarge a region on the display screen 21 which can be a correspondence point to a large GUI region which is displayed on the virtual display screen, according to the GUI which is displayed on the display screen 21.

Meanwhile, when a plurality of GUIs is displayed on the display screen 21, the mapping unit 62 performs a mapping based on an activated (e.g., focused) GUI. Therefore, if the activated GUI is changed, the mapping unit 62 performs a mapping again based on the changed GUI.

<Second Mapping>

Figure 9:
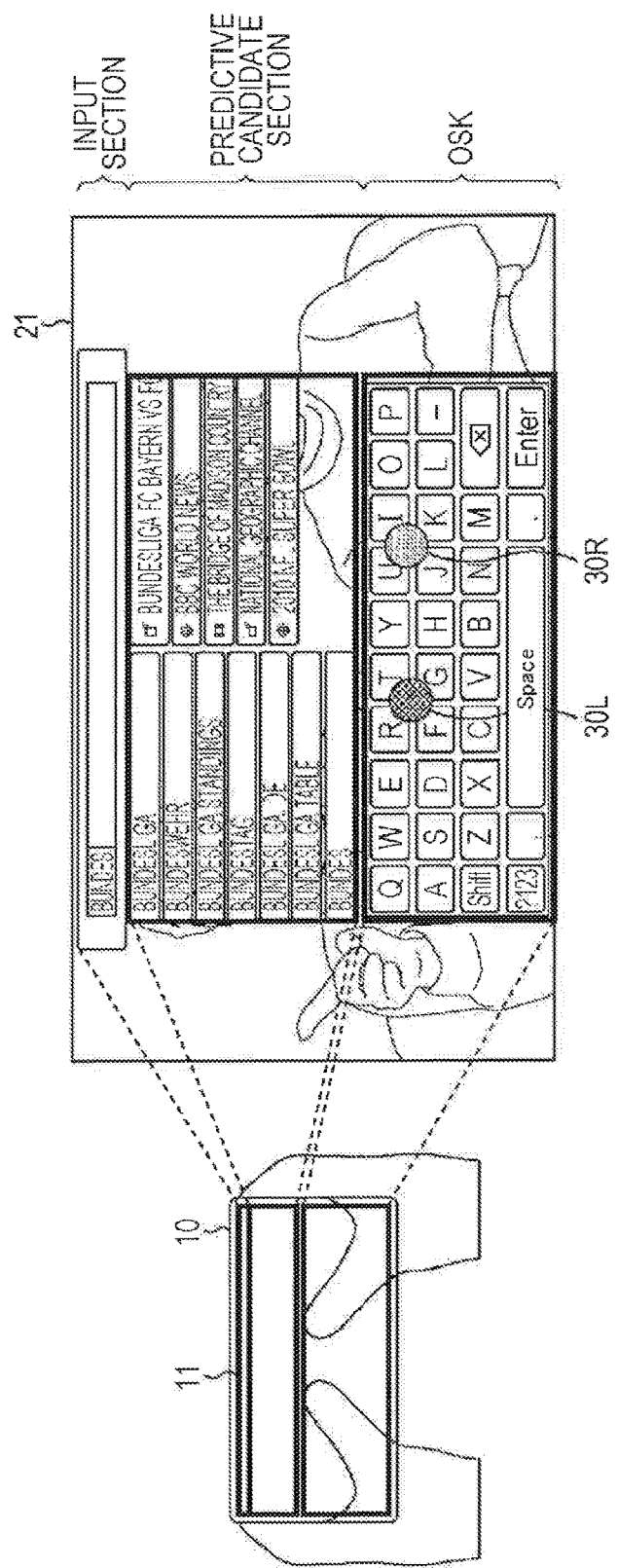
FIG. 9 is a view illustrating a second mapping in accordance with an embodiment of the present disclosure.

FIG. 9 is a view illustrating a second mapping which associates the operation surface 11 with the display screen 21, in accordance with an embodiment of the present disclosure.

The second mapping associates a position on the operation surface 11 with a position on the GUI region based on GUI components which configures the GUI which are displayed on the display screen 21. Therefore, a region on which a GUI component having a small (or large) size is displayed is associated with a wide (or narrow) region of the operation surface 11 compared to the case of the uniform mapping.

Here, in FIG. 9, on the display screen 21, the search GUI which uses the input section, the predictive candidate section, and the OSK as GUI components, is displayed as described with reference to FIG. 7.

Meanwhile, the predictive candidate section which is the GUI component is further configured such that each of the predictive candidates is used as a GUI component. In addition, the OSK which is a GUI component is further configured such that each key is used as a GUI component.

In the search GUI, for example, when attention is paid to the predictive candidate section and the OSK, a predictive candidate which is displayed in the predictive candidate section has a larger horizontal width than each of the keys of the OSK. Therefore, the degree of difficulty of the operation of the predictive candidate is relatively low (i.e., it is easy to be operated) and the degree of difficulty of the operation of the key of the OSK is high (i.e., it is difficult to be operated).

Here, in the second mapping, based on the GUI components which configure the GUI displayed on the display screen 21, a region in which a GUI component having a small size is associated with a wide range of the operation surface 11 compared to the uniform mapping.

That is, in FIG. 9, in the second mapping, a GUI component is associated with the range of the operation surface 11 having a vertical width which is inversely proportional to the horizontal width of the GUI component.

Therefore, in FIG. 9, a predictive candidate having a wide horizontal width is associated with the range of the operation surface 11 having a narrow vertical width compared to the case of the uniform mapping, and the key of the OSK having a narrow horizontal width is associated with the range of the operation surface 11 having a wide vertical width compared to the case of the uniform mapping.

Figure 10:
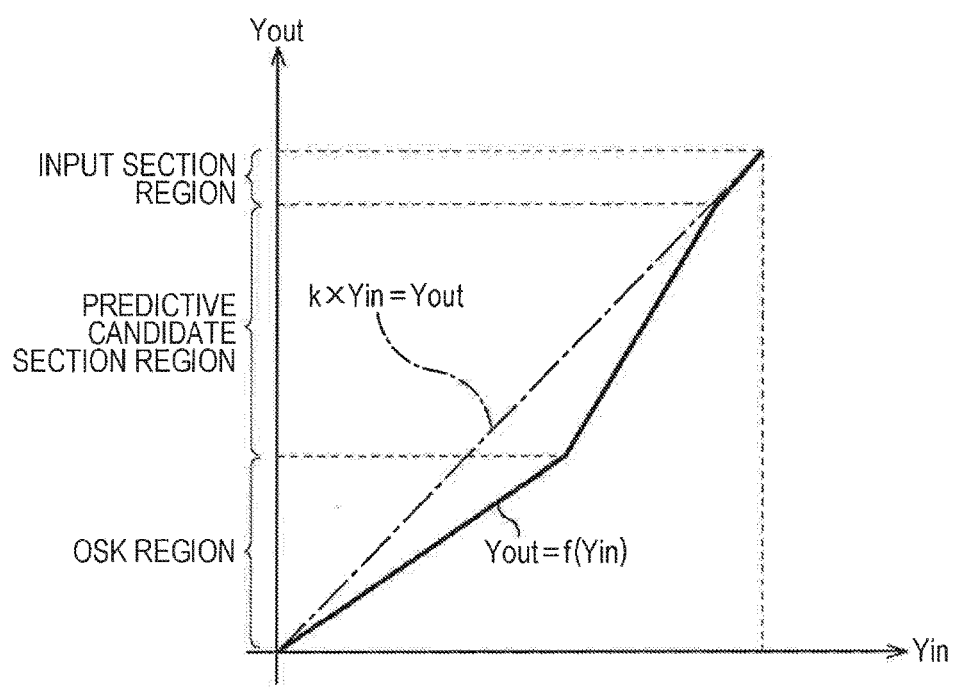
FIG. 10 is a view illustrating the correspondence relationship between a position (Xin,Yin) on the operation surface and a correspondence point (Xout,Yout) on the display screen according to the second mapping, in accordance with an embodiment of the present disclosure.

FIG. 10 is a view illustrating the correspondence relationship between a position (Xin,Yin) on the operation surface 11 and a correspondence point (Xout,Yout) on the display screen 21 according to the second mapping, in accordance with an embodiment of the present disclosure.

Meanwhile, it is assumed that the length H2 of the horizontal direction of the GUI region is kx (=H2/H1) times as large as the length H1 of the horizontal direction of the operation surface 11, and that the length V2 of the vertical direction of the GUI region is ky (=V2/V1) times as large as the length V1 of the vertical direction of the operation surface 11. Further, it is assumed that kx=ky=k.

In addition, for brief explanation, it is assumed that the GUI region is a rectangular-shaped region, that the origin of the 2-dimensional coordinate system which defines positions (Xin,Yin) on the operation surface 11 is the lower left point (vertex) of the operation surface 11, and that the GUI region of the 2-dimensional coordinate system which defines positions (Xout,Yout) is the lower left point on the GUI region.

In the uniform mapping, as shown in FIG. 10 using a dashed line, the positions (Xin,Yin) on the operation surface 11 is associated with the positions (k×Xin,k×Yin) on the GUI region.

Meanwhile, in FIG. 10, the correspondence relationship of the x-coordinate is omitted and only the correspondence relationship of the y-coordinate is shown.

In the second mapping, as shown in FIG. 10 using a solid line, the position Yin on the operation surface 11 (e.g., a position where the y-coordinate is positioned on the operation surface 11 of Yin) is associated with a position Yout=f (Yin) on the GUI region.

Here, the function f(Yin) indicates the second mapping.

According to the function f(Yin) in FIG. 10, the OSK (e.g., a region in which the OSK is displayed) is associated with the range of the operation surface 11 which has a wider vertical width (e.g., a width in the y direction) than that in the case of the uniform mapping, the predictive candidate section is associated with the range of the operation surface 11 having a narrower vertical width (e.g., a width in the y direction) than the case of the uniform mapping, and the input section is associated with the range of the operation surface 11 having the same vertical width as the case of the uniform mapping, respectively.

Meanwhile, in the second mapping in FIG. 9, the same mapping as the uniform mapping is performed on the horizontal direction.

As described above, according to the second mapping, since the OSK which has a narrow horizontal width of a key is associated with the range of the operation surface 11 having a wider vertical width than that in the case of the uniform mapping, the user who operates the operation surface 11 can operate the OSK while sensing that the vertical width of each of the keys of the OSK is practically widened, and thus it is possible to improve the operability of the OSK by lowering the degree of difficulty in operating the keys of the OSK.

That is, according to the second mapping, for example, it is possible to easily point to a GUI component, such as the key of the OSK, a link button to a web page, or the like, which is small in size, and which has a high degree of difficulty in an operation which asks for an elaborate finger movement in the uniform mapping.

Meanwhile, according to the second mapping in FIGS. 9 and 10, since the predictive candidate section is associated with the range of the operation surface 11 having a narrower vertical width than that in the uniform mapping, the degree of difficulty of the operation of the predictive candidate in the predictive candidate section increases in the vertical direction (e.g., y direction).

However, the predictive candidate has a wide horizontal width and operability which is the same as the case of the uniform mapping is secured in the horizontal direction. Therefore, generally, there is little influence on the operability of the predictive candidate section, obtained by associating the predictive candidate section with the range of the operation surface 11 having a narrower vertical width than that in the case of the uniform mapping.

Here, in the second mapping, it is possible to correct a correspondence point in the case of the normal mapping, which corresponds to the position on the operation surface 11, according to (e.g., the size) of the GUI component which is displayed on the display screen 21.

Meanwhile, in FIGS. 9 and 10, as the second mapping, a GUI component is associated with the range of the operation surface 11 having a vertical width which is inversely proportional to the horizontal width of the GUI component (e.g., the range in the vertical width becomes larger (or smaller) as the horizontal width of the GUI component becomes smaller (or larger)). However, in addition thereto, in the second mapping, the GUI component can be associated with the range of the operation surface 11 having a horizontal width which is inversely proportional to the vertical width of the GUI component.

In addition, in FIGS. 9 and 10, in the second mapping, a position on the GUI region is associated with a position on the operation surface 11 or a position on the display screen 21 in the same manner as the first mapping. However, in the second mapping, in addition thereto, for example, it is possible to associate the whole operation surface 11 with the whole display screen 21 in the same manner as the normal mapping.

<Third Mapping>

Figure 11:
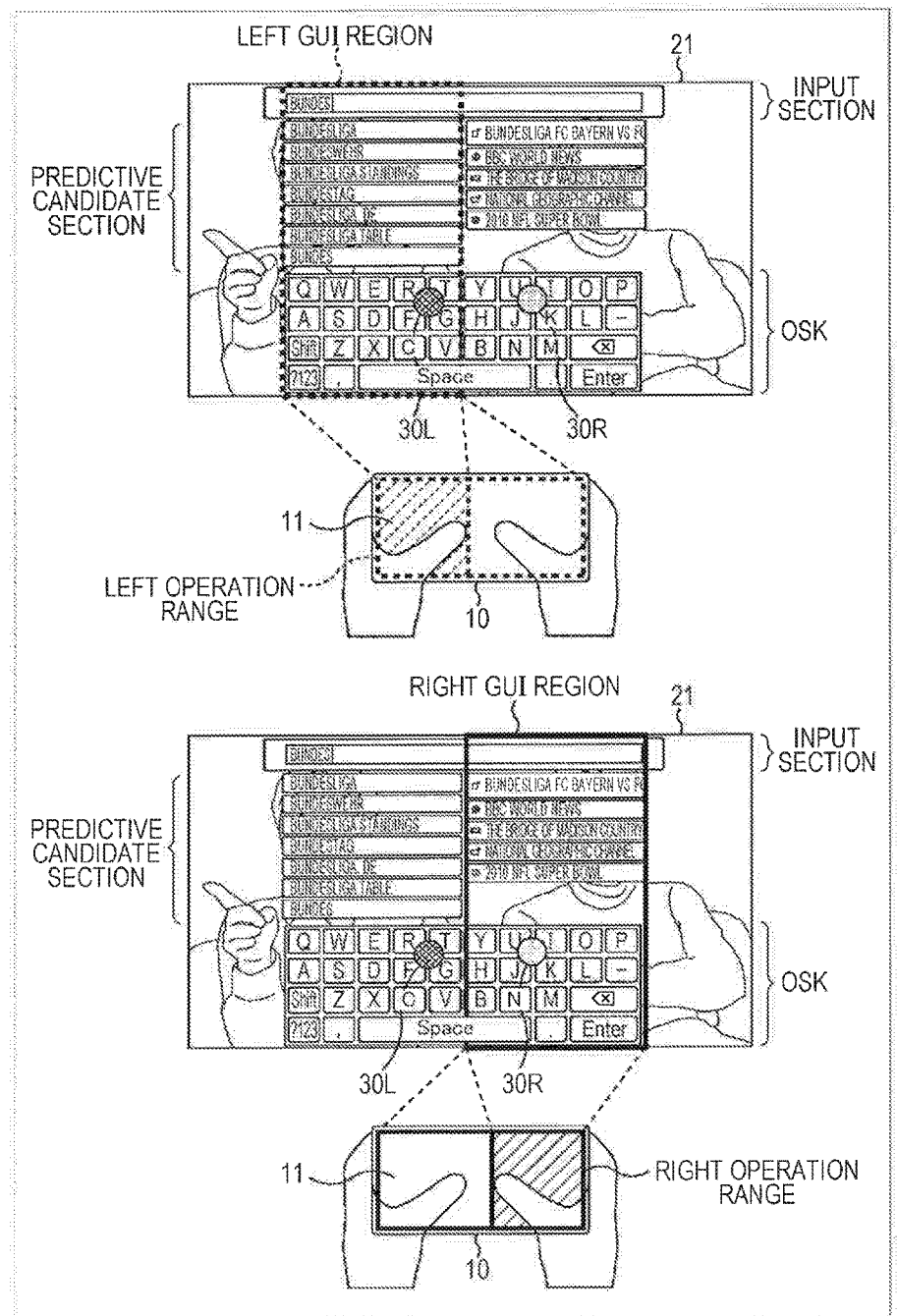
FIG. 11 is a view illustrating a third mapping in accordance with an embodiment of the present disclosure.

FIG. 11 is a view illustrating a third mapping which associates the operation surface 11 with the display screen 21, in accordance with an embodiment of the present disclosure.

In the first and second mappings, the same mapping is applied regardless of whether a touch point on the operation surface 11 is a left touch point which is touched by a left-hand finger of the user or a right touch point which is touched by a right-hand finger of the user. However, in the third mapping, different types of mappings are performed on the left touch point and the right touch point (e.g., an operation performed on the operation surface 11 by the left hand of the user and an operation performed on the operation surface 11 by the right hand).

That is, in the third mapping, with regard to the left touch point, a part of the operation surface 11 is associated with a part of the GUI region. With regard to the right touch point, another part of the operation surface 11 is associated with a remaining part of the GUI region.

In FIG. 11, with regard to the left touch point, the approximately left half range of the operation surface 11 (hereinafter, referred to as a left operation range) as a part of the left side of the operation surface 11 is uniformly associated with the left half of the GUI region. With regard to the right touch point, the approximately right half range of the operation surface 11 (hereinafter, referred to as a right operation range) as a part of the right side of the operation surface 11 is uniformly associated with the right half of the GUI region.

In addition, in FIG. 11, there is a gap between the left operation range and the right operation range of the operation surface 11.

Further, in FIG. 11, the boundary on the right side of the left half region of the GUI region (hereinafter, referred to as a left GUI region) which is associated with the left operation range of the operation surface 11 matches with the boundaries on the right sides of "T", "G", and "V" keys which are arranged on the straight line of the OSK.

In addition, in FIG. 11, the boundary on the left side of the right half region of the GUI region (hereinafter, referred to as a right GUI region) which is associated with the right operation range of the operation surface 11 matches with the boundaries on the left sides of "Y", "H", and "B" keys which are arranged on the straight line of the OSK.

Figure 12:
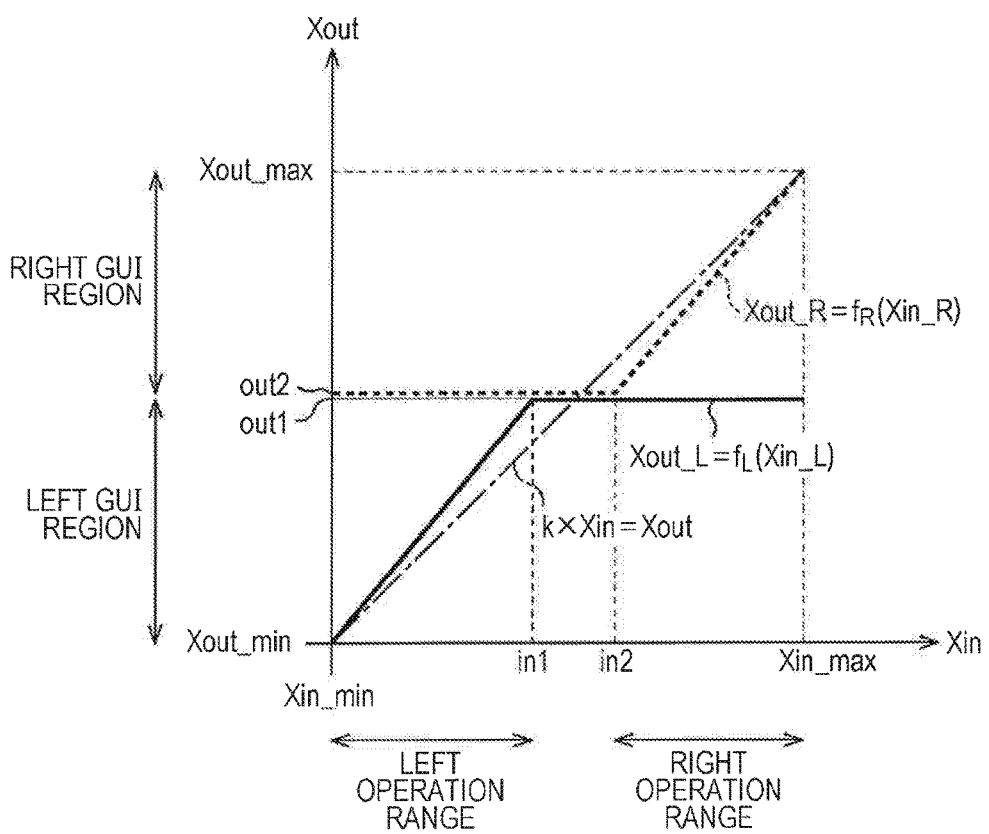
FIG. 12 is a view illustrating the correspondence relationship between the position (Xin,Yin) on the operation surface and the correspondence point (Xout,Yout) on the display screen according to the third mapping, in accordance with an embodiment of the present disclosure.

FIG. 12 is a view illustrating the correspondence relationship between the positions (Xin,Yin) on the operation surface 11 and the correspondence points (Xout,Yout) on the display screen 21 obtained by performing the third mapping, in accordance with an embodiment of the present disclosure.

Meanwhile, it is assumed that the length H2 of the horizontal direction of the GUI region is kx (=H2/H1) times as large as the length H1 of the horizontal direction of the operation surface 11 and that the length V2 of the vertical direction of the GUI region is ky (=V2/V1) times as large as the length V1 of the vertical direction of the operation surface 11. Further, it is assumed that kx=ky=k.

In addition, for brief explanation, it is assumed that the GUI region is a rectangular-shaped region, the lower left point (e.g., positions) on the operation surface 11 are points (Xin_min,Yin_min), and the upper right points are points (Xin_max,Yin_max). Further, it is assumed that the lower left points on the GUI region are points (Xout_min,Yout_min) and upper right points are points (Xout_max,Yout_max).

For example, if it is assumed that (Xin_min,Yin_min)=(Xout_min,Yout_min)=(0,0) at present, in the uniform mapping, the positions (Xin,Yin) on the operation surface 11 are associated with the positions (k×Xin,k×Yin) on the GUI region as shown in FIG. 10 using the dashed line.

Meanwhile, in FIG. 12, the correspondence relationship of the y-coordinate is omitted and only the correspondence relationship of the x-coordinate is shown.

In the third mapping, with regard to a left touch point Xin_L on the operation surface 11 (e.g., a left touch point on the operation surface 11 in which the x-coordinate is Xin_L), the left touch point Xin_L is associated with a position Xout_L=$f_L$(Xin_L) on the GUI region as shown in FIG. 12 using the solid line.

Further, in the third mapping, with regard to the right touch point Xin_R on the operation surface 11, the right touch point Xin_R is associated with a position Xout_R=$f_R$(Xin_R) on the GUI region as shown in FIG. 12 using a dotted line.

Here, the functions $f_L$(Xin_L) and $f_R$(Xin_R) indicate the third mapping.

According to the function $f_L$(Xin_L) in FIG. 12, with regard to the left touch point Xin_L, if the left touch point Xin_L is moved from the left to the right in a range from the left end point Xin_min=0 to the right end point in1 of the left operation range, the left correspondence point Xout_L on the display screen 21 which corresponds to the left touch point Xin_L causes the left GUI region to be moved from the left to the right.

In addition, if the left touch point Xin_L reaches the point in1 of the right end of the left operation range, the left correspondence point Xout_L which corresponds to the left touch point Xin_L reaches the point out1 of the right end of the left GUI region.

Thereafter, even if the left touch point Xin_L moves to the further right side than the point in1 of the right end of the left operation range, the left correspondence point Xout_L which corresponds to the left touch point Xin_L reaches the point out1 of the right end of the left GUI region does not move while being positioned at the point out1 of the right end of the left GUI region.

Meanwhile, according to the function $f_R$(Xin_R), with regard to the right touch point Xin_R, even if the right touch point Xin_R is moved in the range from the left end of the operation surface 11 to the point in2 of the left end of the right operation range, the right correspondence point Xout_R which corresponds to the right touch point Xin_R does not move while being positioned at the point out2 of the left end of the right touch point Xin_R.

If the right touch point Xin_R reaches the point in2 of the left end of the right operation range from the left side of the operation surface 11 and then a range from the point in2 of the left end of the right operation range to the point Xin_max of the right end is moved from the left to the right, the right correspondence point Xout_R on the display screen 21 which corresponds to the right touch point Xin_R causes the right GUI region to be moved from the left to the right.

In addition, if the right touch point Xin_R reaches the point Xin_max of the right end of the right operation range, the right correspondence point Xout_R which corresponds to the right touch point Xin_R reaches the point Xout_max of the right end of the right GUI region.

Meanwhile, in the third mapping shown in FIGS. 11 and 12, with regard to the vertical direction (e.g., the y direction), mapping which is the same as the uniform mapping is performed on both the left touch point and the right touch point.

In the third mapping, when the user moves the left touch point Xin_L from the left to the right on the operation surface 11 (e.g., in the central direction) and the left correspondence point Xout_L which corresponds to the left touch point Xin_L reaches the point out1 of the right end of the left GUI region, the left correspondence point Xout_L does not move from the point out1.

Further, in the third mapping, when the user moves the right touch point Xin_R from the right to the left on the operation surface 11 (e.g., in the central direction) and the right correspondence point Xout_R which corresponds to the right touch point Xin_R reaches the point out2 of the left end of the right GUI region, the right correspondence point Xout_R does not move from the point out2.

Therefore, according to the third mapping, it is possible to prevent the "Y", "H", or "B" key of the OSK which is arranged on the left end of the right GUI region from being erroneously operated when trying to operate the "T", "G", or "V" key of the OSK which is arranged on the right end of the left GUI region using the left touch point. On the contrary, it is possible to prevent the "T", "G", or "V" key of the OSK which is arranged on the right end of the left GUI region from being erroneously operated when trying to operate the "Y", "H", or "B" key of the OSK which is arranged on the left end of the right GUI region using the right touch point.

As a result, the user can point to a part which is at the end portion of the left GUI region in addition to the "T", "G", and "V" keys of the OSK with a rough operation using the left hand, and can point to a part which is at the end portion of the right GUI region in addition to the "Y", "H", and "B" keys of the OSK with a rough operation using the right hand, and thus it is possible to improve the operability.

Here, in the third mapping, it is possible to individually limit a region which can be pointed to by the left hand and a region which can be pointed to by the right hand of the GUI region. Hereinafter, the third mapping is referred to as a limited mapping.

Meanwhile, in FIGS. 11 and 12, as the limited mapping (e.g., the third mapping), the mapping is performed to limit the region which can be pointed to using the left hand and the region which can be pointed to using the right hand of the GUI region in the horizontal direction. However, in addition thereto, it is possible to limit the regions which can be respectively pointed to using the left hand and the right hand in the vertical direction or the like.

In addition, in the limited mapping, it is possible to apply the second mapping in order to associate the left operation range with the left GUI region and to associate the right operation range with the right GUI region.

However, if the limited mapping is regularly applied, there is a case in which a trouble occurs in the operation.

That is, for example, if the limited mapping in FIGS. 11 and 12 is regularly applied, when the operation surface 11 is operated using only either the left hand or the right hand, some keys of the OSK might not be operated by the hand.

Here, the information processing unit 52 of the TV 20 (FIG. 4) performs application determination in order to determine whether or not to apply the limited mapping, and can determine whether or not to apply the limited mapping using the mapping unit 62 according to the result of the application determination.

Figure 13:
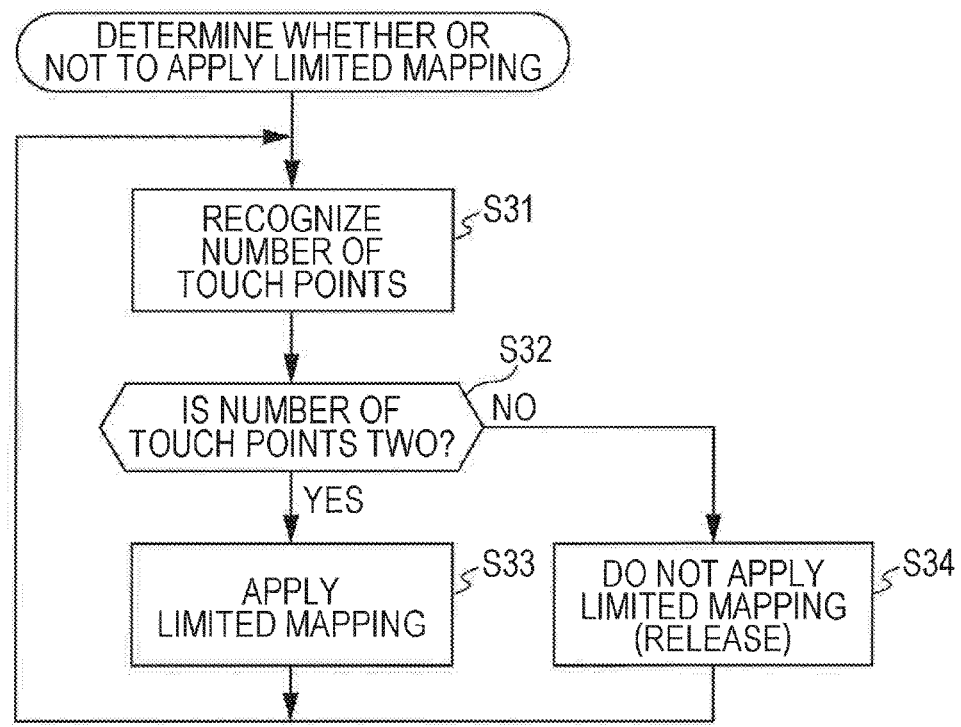
FIG. 13 is a flowchart illustrating a determination process to apply the third mapping (limited mapping) in accordance with an embodiment of the present disclosure.

FIG. 13 is a flowchart illustrating a determination process to apply the limited mapping, in accordance with an embodiment of the present disclosure.

In step S31, the information processing unit 52 recognizes the number of touch points on the operation surface 11 based on the operation information which is supplied from the communication unit 51, and the process proceeds to step S32.

In step S32, the information processing unit 52 determines whether or not the number of touch points is two.

In step S32, when it is determined that the number of touch points is two, that is, when the user touches the operation surface 11 by both (e.g., a finger of) the left hand and (e.g., a finger of) the right hand, and thus the left touch point and the right touch point are present, the process proceeds to step S33. The information processing unit 52 determines to perform the limited mapping using the mapping unit 62, and the process returns to step S31.

In addition, when it is determined that the number of touch points is not two in step S33, that is, for example, when the user touches the operation surface 11 by either the left hand or the right hand, or when the user does not touch the operation surface 11, the process proceeds to step S34. The information processing unit 52 determines not to perform (e.g., to release) the limited mapping using the mapping unit 62, and the process returns to step S31.

According to the above-described application determination process, the mapping of the mapping unit 62 is changed according to the number of touch points. That is, only when the user touches the operation surface 11 by both the left hand and the right hand, is the limited mapping performed. In the other cases, for example, when the user touches the operation surface 11 by only either the left hand or the right hand, the limited mapping is not performed.

Therefore, for example, even if the user operates the operation surface 11 by only either the left hand or the right hand, all of the keys of the OSK may be operated by the limited mapping.

However, in the limited mapping, when the region which can be pointed to using the left hand and the region which can be pointed to using the right hand of the GUI region are individually limited, and also when the pointer 30L or 30R is displayed, it is necessary to recognize whether a touch point (or a correspondence point) is a left touch point (or a left correspondence point) touched by the left hand of the user or a right touch point (or a right correspondence point) touched by the right hand of the user.

Here, the information processing unit 52 of the TV 20 (FIG. 4) performs a touch point recognition process of recognizing whether a touch point recognized from the operation information which is supplied from the communication unit 51 is a left touch point or a right touch point.

Figure 14:
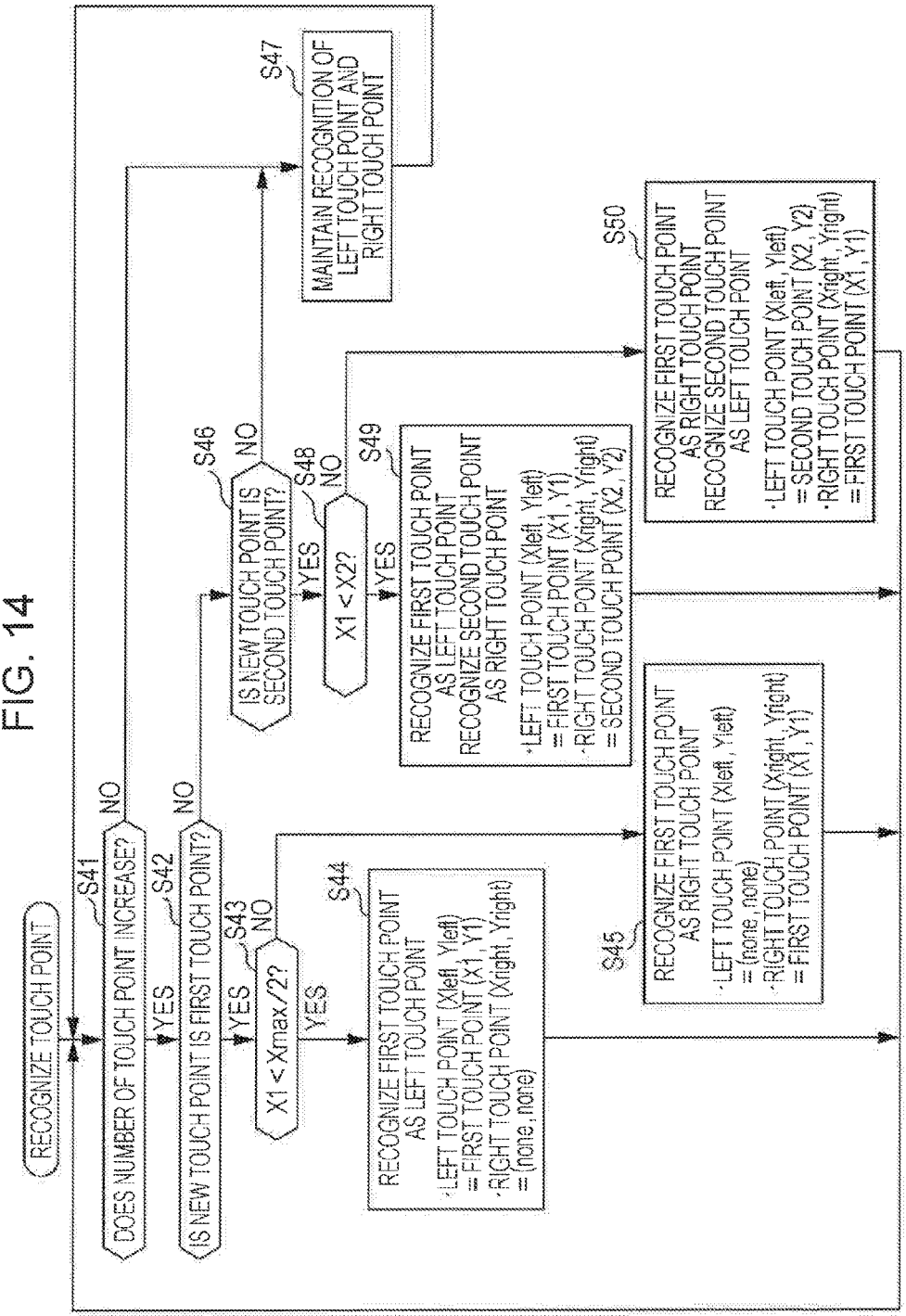
FIG. 14 is a flowchart illustrating a touch point recognition process in accordance with an embodiment of the present disclosure.

FIG. 14 is a flowchart illustrating a touch point recognition process, in accordance with an embodiment of the present disclosure.

In step S41, the information processing unit 52 determines whether or not the number of touch points on the operation surface 11 has increased based on the operation information which is supplied from the communication unit 51.

When it is determined that the number of touch points has not increased in step S41, the process proceeds to step S47.

In addition, when it is determined that the number of touch points has increased in step S41, that is, when a new touch point has appeared, the process proceeds to step S42. The information processing unit 52 determines whether or not the new touch point is a first touch point.

When it is determined that the new touch point is the first touch point in step S42, the process proceeds to step S43. The information processing unit 52 determines whether or not the x-coordinate X1 of the first touch point as the new touch point is less than the x-coordinate Xmax/2 of a middle point (hereinafter, referred to as a middle point coordinate) in the horizontal direction of the operation surface 11.

When it is determined that the x-coordinate X1 of the first touch point is less than the middle point coordinate Xmax/2 in step S43, that is, when the first touch point is a point on the left half side of the operation surface 11, the process proceeds to step S44. The information processing unit 52 recognizes that the first touch point is the left touch point.

Thereafter, the information processing unit 52, according to the recognition that the first touch point is the left touch point, sets first touch point coordinates (X1,Y1) (e.g., which are recognized from the operation information) to (e.g., a variable which indicates) left touch point coordinates (Xleft, Yleft), and sets a value (none,none) which indicates that the right touch point is not present (e.g., undefined) to right touch point coordinates (Xright,Yright). Thereafter, the process returns from step S44 to step S41.

In addition, when it is determined that the x-coordinate X1 of the first touch point is not less than the middle point coordinate Xmax/2 in step S43, that is, when the first touch point is a point on the right half side of the operation surface 11, the process proceeds to step S45. The information processing unit 52 recognizes that the first touch point is the right touch point.

Thereafter, the information processing unit 52, according to the recognition that the first touch point is the right touch point, sets a value (none,none) which indicates that the left touch point is not present to the left touch point coordinates (Xleft,Yleft), and sets the first touch point coordinates (X1,Y1) to the right touch point coordinates (Xright,Yright). Thereafter, the process returns from step S45 to step S41.

Meanwhile, when it is determined that the new touch point is not the first touch point in step S42, the process proceeds to step S46. The information processing unit 52 determines whether or not the new touch point is a second touch point.

When it is determined that the new touch point is not the second touch point in step S46, the process proceeds to step S47. The information processing unit 52 maintains the recognition of the current left touch point and the right touch point as it is, and sets the left touch point coordinates (Xleft,Yleft) and the right touch point coordinates (Xright, Yright) according to the recognition. Thereafter, the process returns to step S41.

In addition, when it is determined that the new touch point is the second touch point in step S46, the process proceeds to step S48. The information processing unit 52 determines whether or not the x-coordinate X2 of the second touch point is greater than the x-coordinate X1 of the first touch point.

When it is determined that the x-coordinate X2 of the second touch point is greater than the x-coordinate X1 of the first touch point in step S48, that is, when the second touch point is present on the further right side than the first touch point on the operation surface 11, the process proceeds to step S49. The information processing unit 52 recognizes that the first touch point is the left touch point and the second touch point is the right touch point.

Thereafter, the information processing unit 52, according to the recognition that the first touch point is the left touch point and the second touch point is the right touch point, sets the first touch point coordinates (X1,Y1) to the left touch point coordinates (Xleft,Yleft) and sets the second touch point coordinates (X2,Y2) (e.g., which is recognized from the operation information) to the right touch point coordinates (Xright,Yright). The process returns from step S49 to step S41.

In addition, when it is determined that the x-coordinate X2 of the second touch point is not greater than the x-coordinate X1 of the first touch point in step S48, that is, when the second touch point is present on the further left side than the first touch point on the operation surface 11, the process proceeds to step S50. The information processing unit 52 recognizes that the first touch point is the right touch point and the second touch point is the left touch point.

Thereafter, the information processing unit 52, according to the recognition that the first touch point is the right touch point and the second touch point is the left touch point, sets the second touch point coordinates (X2,Y2) to the left touch point coordinates (Xleft,Yleft) and sets the first touch point coordinates (X1,Y1) (e.g., which is recognized from the operation information) to the right touch point coordinates (Xright,Yright). The process returns from step S50 to step S41.

With regard to an operation system (e.g., a second operation system) in which the positions on the operation surface 11 have a one to one correspondence with the positions on the display screen 21, the user repeatedly points to necessary spots of the GUI region and performs the determination operation as much as necessary by causing right and left hand fingers to touch the operation surface 11 in order and by moving the fingers when necessary while the right and left hand fingers are touching the operation surface 11.

Therefore, it is possible to recognize whether the touch point is the left touch point or the right touch point by performing the touch point recognition process according to the flowchart in FIG. 14.

Meanwhile, in addition thereto, it is possible to perform the touch point recognition based on, for example, the shadow (e.g., shape) of a finger on the operation surface 11.

In addition, it is possible to perform the touch point recognition based on the approach direction of a finger when the finger is approaching the operation surface 11.

It is possible to detect the approach direction of a finger based on the change in the contact area (e.g., shape) between the finger and the operation surface 11.

In addition, when the sensor 12 can detect the position of a finger on the operation surface 11 in the z direction, it is possible to detect the approach direction of the finger by dragging the positions (x,y,z) of the approached finger.

<Fourth Mapping>

Figure 15:
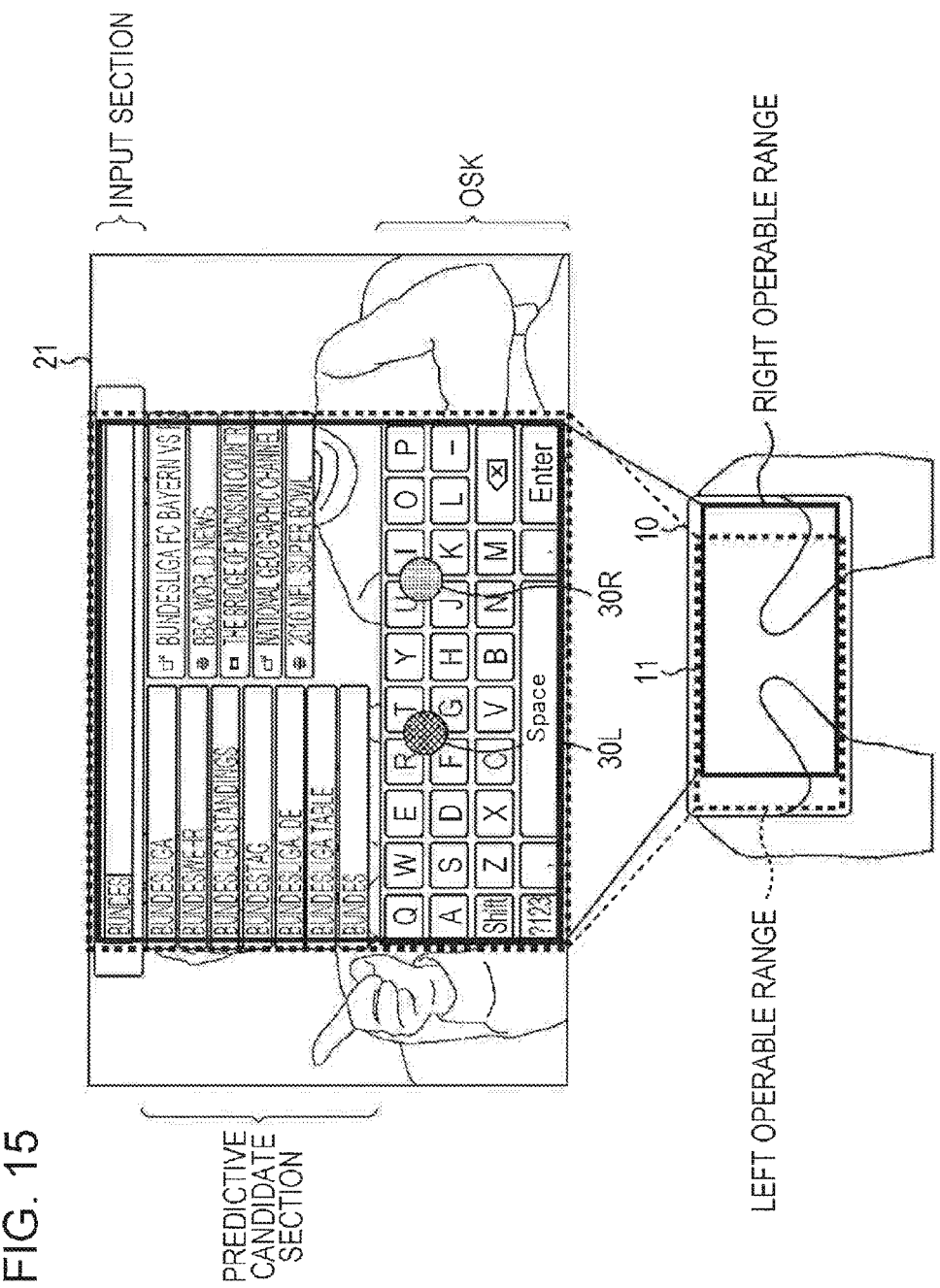
FIG. 15 is a view illustrating a fourth mapping in accordance with an embodiment of the present disclosure.

FIG. 15 is a view illustrating a fourth mapping which associates the operation surface 11 with the display screen 21, in accordance with an embodiment of the present disclosure.

In the fourth mapping, different types of mappings are performed on the left touch point and the right touch point in the same manner as the third mapping.

However, in the third mapping, a part of the operation surface 11 is associated with a part of the GUI region with regard to the left touch point, and another part of operation surface 11 is associated with a remaining part of the GUI region with regard to the right touch point. However, in the fourth mapping, mapping is performed such that the range of the operation surface 11 which is associated with the GUI region with regard to the left touch point deviates from the range of the operation surface 11 which is associated with the GUI region with regard to the right touch point.

Therefore, in a case in which the fourth mapping is applied, it is necessary to perform the touch point recognition in order to recognize whether the touch point is the left touch point or the right touch point in the same manner as the case to which the third mapping is applied.

In FIG. 15, a range from the left end of the operation surface 11 to a position which is slightly central rather than the right end thereof, that is, a range which has a narrower horizontal width than the operation surface 11 is a range which can be operated by a left hand (hereinafter, referred to as a left operable range), and a range from the right end of the operation surface 11 to a position which is slightly central rather than the left end thereof, that is, a range which has a narrower horizontal width than the operation surface 11 is a range which can be operated by a right hand (hereinafter, referred to as a right operable range).

In addition, in FIG. 15, the left operable range is uniformly associated with the GUI region with regard to the left touch point, and the right operable range is uniformly associated with the GUI region with regard to the right touch point.

Therefore, in FIG. 15, the operation surface 11 is associated with the GUI region such that the left operable range which is associated with the GUI region is shifted to the left side from the right operable range with regard to the left touch point, and the right operable range which is associated with the GUI region is shifted to the right side from the left operable range with regard to the right touch point.

Figure 16:
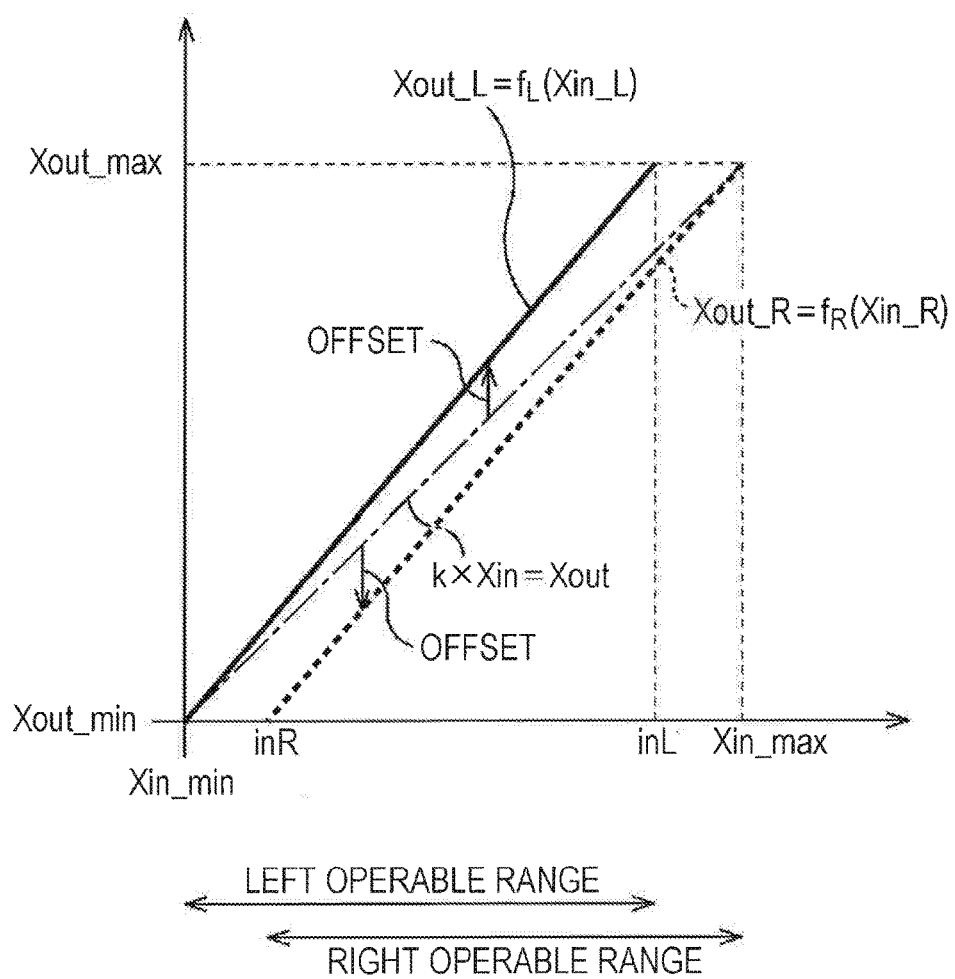
FIG. 16 is a view illustrating the correspondence relationship between the position (Xin,Yin) on the operation surface and the correspondence point (Xout,Yout) on the display screen according to the fourth mapping, in accordance with an embodiment of the present disclosure.

FIG. 16 is a view illustrating the correspondence relationship between the positions (Xin,Yin) on the operation surface 11 and the correspondence points (Xout,Yout) on the display screen 21 according to the fourth mapping, in accordance with an embodiment of the present disclosure.

Meanwhile, it is assumed that the length H2 of the horizontal direction of the GUI region is kx (=H2/H1) times as large as the length H1 of the horizontal direction of the operation surface 11, and that the length V2 of the vertical direction of the GUI region is ky (=V2/V1) times as large as the length V1 of the vertical direction of the operation surface 11. Further, it is assumed that kx=ky=k.

In addition, for brief explanation, it is assumed that the GUI region is a rectangular-shaped region, that lower left points on the operation surface 11 are points (Xin_min, Yin_min), and that upper right points are points (Xin_max, Yin_max). Further, it is assumed that the lower left points on the GUI region are points (Xout_min,Yout_min) and the upper right points therein are points (Xout_max,Yout_max).

For example, if it is assumed that (Xin_min,Yin_min)= (Xout_min,Yout_min)=(0,0) at present, in the uniform mapping, positions (Xin,Yin) on the operation surface 11 are associated with positions (k×Xin,k×Yin) on the GUI region, as shown in FIG. 16 using a dashed line.

Meanwhile, in FIG. 16, the correspondence relationship of the y-coordinate is omitted and only the correspondence relationship of the x-coordinate is shown.

In the fourth mapping, with regard to the left touch point Xin_L on the operation surface 11 (e.g., the left touch point of which the x-coordinate is Xin_L on the operation surface 11), the left touch point Xin_L is associated with a position Xout_L=$f_L$(Xin_L) on the GUI region, as shown in FIG. 16 using a solid line.

Further, in the fourth mapping, with regard to the right touch point Xin_R on the operation surface 11, the right touch point Xin_R is associated with a position Xout_R=$f_R$(Xin_R) on the GUI region, as shown in FIG. 16 using a dotted line.

Here, the functions $f_L$(Xin_L) and $f_R$(Xin_R) indicate the fourth mapping.

According to the function $f_L$(Xin_L) in FIG. 16, with regard to the left touch point Xin_L, the left touch point Xin_L moves only within the left operable range of the range from the point Xin_min of the right end of the operation surface 11 to the point Xin_max of the left end, that is, within the range from the point Xin_min of the left end of the left operable range to the point inL (<Xin_max) of the right end.

In addition, in the fourth mapping, the left operable range which has the narrower horizontal width than the operation surface 11 is uniformly associated with the GUI region (e.g., the coordinates of the left touch point in the left operable range have a proportional relationship to the coordinates of the left correspondence point on the GUI region which corresponds to the left touch point) as shown in FIG. 16. Therefore, as the left touch point Xin_L is positioned on the right side, the left correspondence point Xout_L on the GUI region which corresponds to the left touch point Xin_L is offset (e.g., shifted) (the offset is indicated using an upward arrow in FIG. 16) to the further right compared to the case of the normal matching.

In the same manner, in the fourth mapping, the right operable range which has the narrower horizontal width than the operation surface 11 is uniformly associated with the GUI region as shown in FIG. 16. Therefore, as the right touch point Xin_R is positioned on the left side, the right correspondence point Xout_R on the GUI region which corresponds to the right touch point Xin_R is offset (the offset is indicated using a downward arrow in FIG. 16) to the further left compared to the case of the normal matching.

Meanwhile, in the fourth mapping shown in FIGS. 15 and 16, with regard to the vertical direction (e.g., y direction), the same mapping as the uniform mapping is performed on both the left touch point and the right touch point.

Here, for example, with regard to neighboring keys in the OSK, for example, the "G" key and the "H" key, when trying to continuously operate the "G" key and the "H" key using a left-hand finger and a right-hand finger, respectively, the left-hand finger interferes (e.g., contact) with the right-hand finger on the operation surface 11 in the normal mapping, and thus it is difficult to point to the "H" key using the right-hand finger while pointing to the "G" key using the left-hand finger.

In addition, in a case in which the sensor 12 is an electrostatic touch sensor, if the left-hand finger comes into contact with the right-hand finger, there may be a case in which the two touch points of the left-hand finger and the right-hand finger are detected as a single touch point which has a large contact area based on an electrostatic touch point detection principle. In this case, against the intention of the user, only either the pointers 30L or 30R is displayed instead of the two pointers 30L and 30R and it is difficult to rapidly and continuously operate the "G" key and the "H" key.

In the fourth mapping, as described above, the left correspondence point Xout_L on the GUI region which corresponds to the left touch point Xin_L is offset to the further right compared to the normal mapping, and the right correspondence point Xout_R on the GUI region which corresponds to the right touch point Xin_R is offset to the further left compared to the normal mapping.

Therefore, in the normal mapping, it is difficult to point to the "G" key unless the left-hand finger is moved such that the left touch point Xin_L is positioned on the left near the center of the operation surface 11. However, according to the fourth mapping, it is possible to point to the "G" key using the left correspondence point Xout_L which is offset to the right by moving the left-hand finger such that the left touch point Xin_L is positioned on the left which is a little away from the center of the operation surface 11.

In the same manner, in the normal mapping, it is difficult to point to the "H" key unless the right-hand finger is moved such that the right touch point Xin_R is positioned on the right near the center of the operation surface 11. However, according to the fourth mapping, it is possible to point to the "H" key using the right correspondence point Xout_R which is offset to the left by moving the right-hand finger such that the right touch point Xin_R is positioned on the left which is a little away from the center of the operation surface 11.

As a result, with regard to the neighboring keys in the OSK, that is, the "G" key and the "H" key, when trying to continuously operate the "G" key and the "H" key using the left-hand finger and the right-hand finger, respectively, it is possible to point to the "G" key using the left-hand finger and point to the "H" key using the right-hand finger in a state in which the left-hand finger is a little away from the right-hand finger on the operation surface 11.

Therefore, when trying to continuously operate the neighboring keys in the OSK using the left-hand finger and the right-hand finger, the left-hand finger and the right-hand finger are prevented from interfering with each other, and the two touch points of the left-hand finger and the right-hand finger are prevented from being detected as a single touch point having a large contact area, and thus it is possible to improve the operability.

Meanwhile, in the fourth mapping shown in FIGS. 15 and 16, the left operable range is associated with the whole GUI region and the right operable range is associated with the whole GUI region. Therefore, it is possible to point to an arbitrary point in the GUI region which includes all the keys of the OSK using only either the left-hand finger or the right-hand finger.

Here, in the fourth mapping, based on the fact of whether the touch point is the left touch point or the right touch point and the coordinate of the touch point (e.g., in FIGS. 15 and 16, the x-coordinate), it is possible to perform correction in order to offset the correspondence point of the touch point. Hereinafter, the fourth mapping is referred to as an offset mapping.

In the offset mapping in FIGS. 15 and 16, with regard to the left touch point, as the x-coordinate Xin_L of the left touch point becomes larger, the amount of offset (indicated by an upward arrow in FIG. 16) in the positive direction of the x-coordinate Xout_L of the left correspondence point increases compared to the case of the uniform mapping (indicated by a dashed line in FIG. 16) which associates the touch points (Xin,Yin) with the correspondence points (k×Xin,k×Yin).

Therefore, as the left touch point is positioned on the right side, the left correspondence point is offset to the further right side compared to the case of the uniform mapping.

In addition, in the offset mapping in FIGS. 15 and 16, with regard to the right touch point, as the x-coordinate Xin_R of the right touch point is small, the amount of offset (indicated by a downward arrow in FIG. 16) in the negative direction of the x-coordinate Xout_R of the right correspondence point increases compared to the case of the uniform mapping (indicated by the dashed line in FIG. 16).

Therefore, as the right touch point is positioned on the left side, the right correspondence point is offset to the further left side compared to the case of the uniform mapping.

As described above, the left correspondence point is offset to the right side and the right correspondence point is offset to the left side. Therefore, when the left-side key of the two keys of the OSK which are horizontally adjacent to each other is operated by the left-hand finger and the right-side key is operated by the right-hand finger, it is possible to point to two adjacent keys using the left-hand finger and the right-hand finger in the state in which the left-hand finger is a little away from the right-hand finger on the operation surface 11.

Meanwhile, in FIGS. 15 and 16, the mapping which offsets the correspondence point in the horizontal direction is performed as the offset mapping (e.g., fourth mapping). However, in addition thereto, in the offset mapping, it is possible to offset a correspondence point which is positioned on the upper side between the left correspondence point and the right correspondence point to the lower side, and to offset a correspondence point which is positioned on the lower side to the upper side.

In this case, for example, when two keys of the OSK which are vertically adjacent to each other are operated by the left-hand finger and the right-hand finger, it is possible to prevent the left-hand finger and the right-hand finger from interfering with each other.

In addition, when the left operable range is associated with the GUI region and the right operable range is associated with the GUI region in the offset mapping, it is possible to apply the second mapping.

Meanwhile, the interference or the like between the left-hand finger and the right-hand finger occurs when the operation surface 11 is operated using the left-hand finger and the right-hand finger. Therefore, the offset mapping is not applied when the touch point is a single point or less, and the offset mapping can be applied only when the touch points are two points.

However, if the offset mapping is not applied when the touch point is a single point and the offset mapping is set to be applied only when the touch points are two points, the pointers 30L and 30R which are displayed on the display screen 21 jumps to move when the touch point is changed from a single point to two points and when two points are changed into a single point. As a result, the user may be caused to feel a sense of incompatibility.

Therefore, it is possible to apply the offset mapping regardless of the number of touch points.

Meanwhile, as described in FIG. 4, when the operation surface 11 is integrally configured with the display unit such as a liquid crystal panel or the like and functions as a touch screen which can display an image and can receive an input with respect to the image, it is possible to display, for example, the GUI which is displayed on the display screen 21 of the TV 20 and, for example, the OSK which is the GUI component configuring the GUI, on the operation surface 11 which functions as the touch screen in the terminal 10.

For example, when the OSK which is displayed on the display screen 21 of the TV 20 is also displayed on the operation surface 11 of the terminal 10, there may be cases in which the user operates the operation surface 11 while watching the OSK which is displayed on the display screen 21 of the TV 20 apart from the user, and in which the user operates the operation surface 11 while watching the OSK which is displayed on the operation surface 11 of the terminal 10 on hand.

If the offset mapping is applied when the user operates the operation surface 11 while watching the OSK which is displayed on the operation surface 11 of the terminal 10 on hand, there is a case in which the key of the OSK touched by the user on the operation surface 11 does not coincide with the key of the OSK pointed to by the pointer 30L or 30R on the display screen 21. In this case, the user may be caused to feel a sense of incompatibility.

Here, the application determination is performed in order to determine whether or not to apply the offset mapping in the information processing unit 52 of the TV 20 (FIG. 4), and thus it is possible to determine whether or not to apply the offset mapping in the mapping unit 62 according to the result of the application determination.

Figure 17:
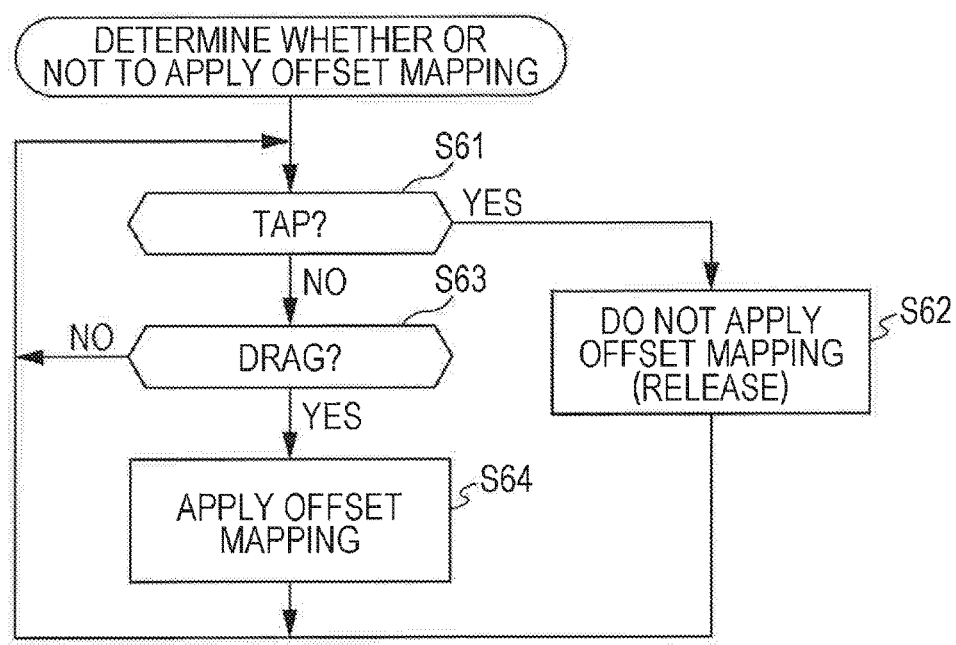
FIG. 17 is a flowchart illustrating a determination process to apply the fourth mapping (offset mapping) in accordance with an embodiment of the present disclosure.

FIG. 17 is a flowchart illustrating a process of the application determination of the offset mapping, in accordance with an embodiment of the present disclosure.

In step S61, the information processing unit 52 determines whether or not the operation performed by the user on the operation surface 11 is tapping based on the operation information which is supplied from the communication unit 51.

In step S61, when it is determined that the operation performed by the user on the operation surface 11 is tapping, the process proceeds to step S62. The information processing unit 52 determines that the offset mapping is not performed (e.g., released) in the mapping unit 62, and the process returns to step S61.

In addition, when it is determined that the operation performed by the user on the operation surface 11 is not tapping in step S61, the process proceeds to step S63. The information processing unit 52 determines whether or not the operation performed by the user on the operation surface 11 is dragging based on the operation information which is supplied from the communication unit 51.

When it is determined that the operation performed by the user on the operation surface 11 is not dragging in step S63, the process returns to step S61.

In addition, when it is determined that the operation performed by the user on the operation surface 11 is dragging in step S63, the process proceeds to step S64. The information processing unit 52 determines to perform the offset mapping in the mapping unit 62, and the process returns to step S61.

That is, when the user performs a drag operation on the operation surface 11, it is assumed that the user operates the operation surface 11 while watching the OSK or the like which is displayed on the display screen 21 of the TV 20. Therefore, the mapping unit 62 performs the offset mapping.

On the other hand, when the user performs a tap operation on the operation surface 11, it is assumed that the user operates the operation surface 11 while watching the OSK or the like which is displayed on the operation surface 11. Therefore, the mapping unit 62 does not perform the offset mapping.

In this case, it is possible to prevent the user from feeling a sense of incompatibility while the key of the OSK touched by the user on the operation surface 11 does not coincide with the key of the OSK pointed to by the pointer 30L or 30R on the display screen 21.

Meanwhile, when the operation surface 11 functions as the touch screen, the terminal 10 can be operated in a stand-alone mode like a smart phone or the like.

In this case, the terminal 10 is provided with the same block as the mapping unit 62 and the correspondence point detection unit 63 shown in FIG. 4, and can perform mapping and detection of a correspondence point which corresponds to a touch point.

FIG. 18 is a view illustrating an example of the display of the operation surface 11 as the touch screen of such a terminal 10, in accordance with an embodiment of the present disclosure.

In FIG. 18, the OSK is displayed on the operation surface 11, and the input section is displayed on the upper portion of the OSK.

In FIG. 18, letters which are input by operating the OSK are displayed in the input section.

In FIG. 18, the offset mapping which performs correction in order to offset the correspondence point which corresponds to the touch point is performed in both directions of the x direction (e.g., the horizontal direction) and the y direction (e.g., the vertical direction) of the terminal 10.

However, with regard to the x direction, the offset mapping in which the offset amount of the x-coordinate of the correspondence point which corresponds to the touch point varies according to the x-coordinate of the touch point (hereinafter, referred to as a variable offset mapping) is performed as described in FIG. 15. However, with regard to the y direction, the offset mapping in which the offset amount of the y-coordinate of the correspondence point which corresponds to the touch point is uniform regardless of the y-coordinate of the touch point (hereinafter, referred to as a fixed offset mapping) is performed.

In FIG. 18, in terminal 10, the left correspondence point which corresponds to the left touch point and the right correspondence point which corresponds to the right touch point are detected based on the result of the above-described offset mapping. A pointer 15L is displayed at the left correspondence point of the operation surface 11 as a symbol image which indicates that the left-hand finger is touched, a pointer 15R is displayed at the right correspondence point of the operation surface 11 as a symbol image which indicates that the right-hand finger is touched.

In FIG. 18, as described above, the variable offset mapping is performed with regard to the x direction, and the fixed offset mapping is performed with regard to the y direction. Therefore, when the left touch point is positioned at the left end of the OSK which is displayed on the operation surface 11 as shown in FIG. 18A, the left correspondence point which corresponds to the left touch point is positioned obtained by offsetting a predetermined offset amount in the y direction (upper direction) from the left touch point.

As described above, since the pointer 15L is displayed at the left correspondence point of the position obtained by offsetting the predetermined offset amount in the y direction from the left touch point, it is possible to prevent the pointer 15L from being hidden by the left-hand finger which touches the left touch point and being invisible.

In the same manner, with regard to the right touch point, when the right touch point is positioned at the right end of the OSK which is displayed on the operation surface 11, the pointer 15R is displayed at the right correspondence point of the position obtained by offsetting the predetermined offset amount in the y direction from the right touch point. Therefore, it is possible to prevent the pointer 15R from being hidden by the right-hand finger which touches the right touch point.

In addition, when the left touch point is positioned on the left near the center of the OSK which is displayed on the operation surface 11 shown in FIG. 18B, the left correspondence point which corresponds to the left touch point is at a position obtained by offsetting a predetermined offset amount in the y direction from the left touch point and offsetting the offset amount which increases according to the x-coordinate of the left touch point in the x direction (e.g., right direction) (e.g., near center).

As described above, the pointer 15L is displayed at the left correspondence point of the position (e.g., the upper left position of the left touch point) near the center by offsetting a predetermined offset amount in the y direction from the left touch point and by offsetting the offset amount which increases according to the x-coordinate of the left touch point in the x direction.

In addition, when the left touch point is positioned on the right near the center of the OSK which is displayed on the operation surface 11 as shown in FIG. 18B, the right correspondence point which corresponds to the right touch point is positioned obtained by offsetting a predetermined offset amount in the y direction from the right touch point and offsetting the offset amount which increases according to the x-coordinate of the right touch point in the x direction (e.g., left direction) (e.g., near center).

As described above, the pointer 15R is displayed at the right correspondence point of the position (e.g., the upper right position of the right touch point) near the center by offsetting by a predetermined offset amount in the y direction from the right touch point and by offsetting the offset amount which increases according to the x-coordinate of the right touch point in the x direction.

Therefore, it is possible to prevent the pointers 15L and 15R from being hidden by fingers, and it is possible to prevent the left-hand finger and the right-hand finger from being contact with each other when the two adjacent keys of the OSK are operated by the left-hand finger and the right-hand finger.

As described above, for example, in the stand-alone terminal 10, the variable offset mapping is performed with regard to the x direction and the fixed offset mapping is performed with regard to the y direction, and thus it is possible to prevent the pointers 15L and 15R which are displayed on the operation surface 11 from being hidden by fingers. Therefore, the user easily recognizes the pointed keys of the OSK by watching the pointers 15L and 15R, and thus it is possible to perform operation without serious burden even when the keys of the OSK are small.

Further, according to the offset mapping in the x direction, it is possible to reduce a distance in which a finger is moved in the x direction when pointing to the key of the OSK.

Meanwhile, it is possible to display the pointers 15L and 15R such that the user can easily distinguish the respective pointers by changing the display formats thereof in the same manner as the pointers 30L and 30R.

In addition, in FIG. 18, it is possible to display the letters of the keys of the OSK, which are pointed to and on which the determination operation described in FIG. 2 is performed, in the input section. In addition thereto, it is possible to perform so-called preview display of the letters of the keys of the OSK which are pointed to and on which the determination operation is not performed.

Further, when the preview display is performed in the input section, the display can be performed using the same display format as each of the pointers 15L and 15R such that the user easily distinguishes the letter of the key pointed to with the left-hand finger from the letter of the key pointed to with the right-hand finger. In this case, the user can operate the OSK by performing a so-called blind touch while watching the input section.

Meanwhile, in FIG. 18, two-letter preview display, that is, the letter of a key pointed to by the left-hand finger (pointer 15L) and the letter of a key pointed to by the right-hand finger (pointer 15R) is performed. However, when two letters are displayed in the preview display, there is a case in which readability is deteriorated, and thus it is hard to read. Here, in the preview display, it is possible to selectively display one of the letter of the key pointed to by the pointer 15L and the letter of the key pointed to by the pointer 15R. That is, in the preview display, for example, it is possible to display only a single letter of the key pointed to by the pointer of the pointers 15L and 15R, which has a large movement distance from when the previous determination operation is performed.

<Description of Computer in Accordance with Embodiments>

Subsequently, the above-described series of processes can be performed using hardware or can be performed using software. When a series of processes is performed using software, a program which configures the software is installed in a general purpose computer or the like.

Here, FIG. 19 shows a configuration example of a computer in which a program in accordance with an embodiment of the present disclosure which performs the above-described series of process is installed.

The program can be recorded in a hard disk 105 or a ROM 103 in advance which functions as a recording medium which is built in a computer.

Alternatively, the program can be stored (e.g., recorded) in a removable recording medium 111. Such a removable recording medium 111 can be provided as a so-called package software. Here, the removable recording medium 111 includes, for example, a flexible disk, a Compact Disc Read Only Memory (CD-ROM), a Magneto Optical (MO) disk, a Digital Versatile Disc (DVD), a magnetic disc, a semiconductor memory, and the like.

Meanwhile, the program is installed in a computer from the above-described removable recording medium 111, and besides, the program can be downloaded onto a computer via a communication network or a broadcasting network and installed in the built-in hard disk 105. That is, for example, the program can be wirelessly transmitted to a computer from a downloading site via satellites of digital satellite broadcasting, or can be transmitted to a computer in a wired manner via a network such as a Local Area Network (LAN) or the Internet.

The computer includes a built-in Central Processing Unit (CPU) 102, and an input/output interface 110 is connected to the CPU 102 via a bus 101.

When a command is input via the input/output interface 110 in such a way that the input unit 107 is operated by a user, the CPU 102 executes a program which is stored in a Read Only Memory (ROM) 103 according to the command. Alternatively, the CPU 102 loads a program which is stored in the hard disk 105 to a Random Access Memory (RAM) 104, and executes the program.

Therefore, the CPU 102 performs a process according to the above-described flowchart or a process which is performed by the configuration of the above-described block diagram. In addition, the CPU 102, for example, causes the result of the process to be output from an output unit 106, to be transmitted from a communication unit 108, or to be recorded in the hard disk 105 via the input/output interface 110 when necessary.

Meanwhile, the input unit 107 includes a keyboard, a mouse, a microphone, and the like. In addition, the output unit 106 includes a Liquid Crystal Display (LCD), a speaker, and the like.

Here, in the present specification, the process which is performed by a computer according to a program is not necessarily chronologically performed according to the order which is described in the flowchart. That is, the process which is performed by the computer according to the program includes processes which are performed in parallel or individually (for example, a parallel process or a process according to an object).

In addition, the program may be processed by a single computer (e.g., processor), or may be distributed to be processed by a plurality of computers. Further, the program may be transmitted to a remote computer to be executed.

Further, in the present specification, the system means an aggregate of a plurality of configuring elements (e.g., apparatuses, modules (components), and the like), and it does not matter whether all in the configuring elements are included in the same housing. Therefore, in a plurality of apparatuses which are stored in the individual housings and connected via the network, and a single apparatus in which a plurality of modules are stored in a single housing, any one is also a system.

Meanwhile, the embodiments of the present disclosure are not limited to the above-described embodiments, and various types of modifications are possible in a range which does not depart from the gist of the present disclosure.

For example, embodiments of the present disclosure can use the configuration of cloud computing in which a single function is shared between a plurality of apparatuses over a network and jointly executed.

In addition, the respective steps in the above-described flowchart can be not only shared with and executed in a plurality of apparatuses but also executed in a single apparatus.

Further, when a plurality of processes configure a single step, the plurality of processes included in the single step can be not only shared with and executed in a plurality of apparatuses but also executed in a single apparatus.

In addition, in the embodiments, in the terminal 10, the information which indicates a touch point on the operation surface 11 configures the operation information and then transmitted to the TV 20. However, in the terminal 10, information which indicates a correspondence point corresponding to the touch point on the operation surface 11 may be included in the operation information and then transmitted to the TV 20.

When, in the terminal 10, the information which indicates the correspondence point corresponding to the touch point on the operation surface 11 configures the operation information and then transmitted to the TV 20, it is necessary for the terminal 10 to perform mapping and detection of the correspondence point corresponding to the touch point. Therefore, the mapping unit 62 and the correspondence point detection unit 63 (FIG. 4) are not provided in the TV 20 but in the terminal 10.

Further, in the embodiments, the display control unit 61 separately displays the pointer 30L or 30R as a symbol image which indicates that the correspondence point corresponding to the touch point is touched, from the GUI which is displayed on the display screen 21. However, the display control unit 61 may display that the touch is performed by changing a display format, for example, the luminance or color of a GUI component which is displayed at the correspondence point instead of displaying the symbol image at the correspondence point.

Meanwhile, embodiments of the present disclosure may include the following configurations.

(1) An information processing apparatus including:

an operation surface configured to receive touch inputs; and a sensor unit configured to detect at least one right-side touch input from a manipulation by a user of the operation surface within a first operational area of the operation surface, and at least one left-side touch input from a manipulation by the user of the operation surface within a second operational area of the operation surface, wherein the first operational area and the second operational area of the operation surface are mapped to a graphical user interface (GUI) area of a display device.

(2) The information processing apparatus of (1), wherein the first operational area is spaced apart and separated from the second operational area by a gap on the operation surface.

(3) The information processing apparatus of (1), wherein the first operational area and the second operational area are at least partially overlapping each other.

(4) The information processing apparatus of (1), wherein the first operational area and the second operational area substantially overlap each other.

(5) The information processing apparatus of (1), wherein, upon detection of the at least one right-side touch input, a first focus corresponding to the detected at least one right-side touch input is displayed in the GUI area of the display device, and wherein, upon detection of the at least one left-side touch input, a second focus corresponding to the detected at least one left-side touch input is displayed in the GUI area of the display device.

(6) The information processing apparatus of (5), wherein the first focus is not displayed in the GUI area of the display device when the at least one right-side touch input is no longer detected, and the second focus is not displayed in the GUI area of the display device when the at least one left-side touch input is no longer detected.

(7) The information processing apparatus of (5), wherein the first focus and the second focus each comprise a pointer icon.

(8) The information processing apparatus of (5), wherein the first focus and the second focus each comprise a highlighting of a respective associated region within the GUI area.

(9) The information processing apparatus of (5), wherein the first focus and the second focus each comprise a highlighting of a respective associated key of an on-screen keyboard (OSK) displayed within the GUI area of the display device.

(10) The information processing apparatus of (1), wherein, upon detection of a first operation tool approaching the operation surface for delivering the at least one right-side touch input, a first focus corresponding to the detected approaching first operation tool is displayed in the GUI area of the display device, and wherein, upon detection of a second operation tool approaching the operation surface for delivering the at least one left-side touch input, a second focus corresponding to the detected approaching second operation tool is displayed in the GUI area of the display device.

(11) The information processing apparatus of (1), wherein the sensor unit is further configured to recognize touch inputs received by the operation surface as either right-hand touch inputs or left-hand touch inputs.

(12) The information processing apparatus of (11), wherein the sensor unit recognizes each of the touch inputs as either a right-hand touch input or a left-hand touch input based on x-coordinate locations of points at which respective touch inputs are made on the operation surface.

(13) The information processing apparatus of (11), wherein the sensor unit recognizes each of the touch inputs as either a right-hand touch input or a left-hand touch input based on a shadow shape made on the operation surface when the operation surface receives a respective touch input.

(14) The information processing apparatus of (1), wherein the GUI area of the display device to which the first operational area and the second operational area of the operation surface are mapped is smaller than a total display area of the display device.

(15) The information processing apparatus of (1), wherein the first operational area of the operation surface is mapped to a first area of the GUI area of the display device, and the second operational area of the operation surface is mapped to a second area of the GUI area of the display device.

(16) The information processing apparatus of (15), wherein the right-operational area of the operation surface is mapped to a first section of an on-screen keyboard (OSK) of the GUI area of the display device, and the left-operational area of the operation surface is mapped to a second section of the OSK of the GUI area of the display device.

(17) The information processing apparatus of (1), wherein a second GUI is overlaid on an area of the operation surface, the second GUI corresponding to the GUI area of the display device.

(18) The information processing apparatus of (1), wherein a text-entry portion of the operation surface is mapped to an on-screen keyboard (OSK) of the GUI area of the display device.

(19) The information processing apparatus of (18), wherein a mapping size ratio of mapping the text-entry portion of the operation surface to the OSK of the GUI area of the display device is larger than a mapping size ratio of other portions of the operation surface mapped to corresponding portions of the GUI area of the display device.

(20) An information processing method including:
mapping a first operational area and a second operational area of an operation surface of a terminal device to a graphical user interface (GUI) area of a display device;
detecting at least one right-side touch input from a manipulation by a user of the operation surface within the first operational area of the operation surface; and
detecting at least one left-side touch input from a manipulation by the user of the operation surface within the second operational area of the operation surface.

(21) The information processing method of (20), further including:
displaying, in the GUI area of the display device, a first focus corresponding to the detected at least one first touch input when the at least one first touch input is detected; and
displaying, in the GUI area of the display device, a second focus corresponding to the detected at least one second touch input when the at least one second touch input is detected.

(22) A non-transitory computer-readable medium embodied with a program, which when executed by a computer, causes the computer to perform a method including:
mapping a first operational area and a second operational area of an operation surface of a terminal device to a graphical user interface (GUI) area of a display device;

detecting at least one right-side touch input from a manipulation by a user of the operation surface within the first operational area of the operation surface; and
detecting at least one left-side touch input from a manipulation by the user of the operation surface within the second operational area of the operation surface.

(23) The non-transitory computer-readable medium of (22), wherein the computer is caused to further perform:
displaying, in the GUI area of the display device, a first focus corresponding to the detected at least one first touch input when the at least one first touch input is detected; and
displaying, in the GUI area of the display device, a second focus corresponding to the detected at least one second touch input when the at least one second touch input is detected.

(24) An information processing apparatus including: a mapping unit that performs a mapping which associates a position on an operation surface which is operated by a user with a position on a display screen on which an image is displayed based on graphics which are displayed on the display screen; and a detection unit that detects a correspondence point which is a position on the display screen and corresponds to the position on the operation surface which is operated by the user based on a result of the mapping.

(25) The information processing apparatus of (24) further including: a display control unit that displays a symbol image which indicates that an operation is performed at the correspondence point or that changes a display format of graphic components which configure the graphics on the correspondence point.

(26) In the information processing apparatus of (24) or (25), the mapping unit performs the mapping based on the graphics which are displayed on the display screen such that the position on the operation surface is associated with a position on a graphic region on which the graphics are displayed within the position on the display screen.

(27) In the information processing apparatus of (26), the mapping unit performs the mapping such that the operation surface is uniformly associated with the graphic region.

(28) In the information processing apparatus of any one of (24) to (26), the mapping unit performs the mapping based on the graphic components which configure the graphics displayed on the display screen such that the position on the operation surface is associated with the position on the display screen.

(29) In the information processing apparatus of (28), the mapping unit performs the mapping such that a region on which small-sized graphic components are displayed is associated with a wider range of the operation surface, compared to a uniform mapping which uniformly associates the operation surface with the graphic region.

(30) In the information processing apparatus of any one of (26) to (29), the mapping unit performs different types of mapping with regard to an operation which is performed on the operation surface by a left hand of a user and an operation which is performed on the operation surface by a right hand.

(31) In the information processing apparatus of (30), the mapping unit performs an offset mapping which causes the range of the operation surface which is associated with the graphic region with regard to the operation performed on the operation surface by a left hand of the user to be shifted, from the range of the operation surface which is associated with the graphic region with regard to the operation on the operation surface by the right hand.

(32) In the information processing apparatus of (31), in the offset mapping, the mapping unit causes the range of the operation surface which is associated with the graphic region to be shifted to a left side with regard to the operation which is performed on the operation surface by the left hand of the user, and causes the range of the operation surface which is associated with the graphic region to be shifted to a right side with regard to the operation which is performed on the operation surface by the right hand.

(33) In the information processing apparatus of (31), the mapping unit adopts the offset mapping when a drag operation is performed on the operation surface, and does not adopt the offset mapping when a tap operation is performed on the operation surface.

(34) In the information processing apparatus of (30), the mapping unit performs the mapping such that a part of the operation surface is associated with a part of the graphic region with regard to the operation which is performed on the operation surface by the left hand of the user, and that another part of the operation surface is associated with a remaining part of the graphic region with regard to the operation which is performed on the operation surface by the right hand of the user.

(35) In the information processing apparatus of (34), the mapping unit performs the mapping such that a part of the left side of the operation surface is associated with a remaining left half of the graphic region with regard to the operation which is performed on the operation surface by the left hand of the user, and that a part of a right side of the operation surface is associated with a remaining right half of the graphic region with regard to the operation which is performed on the operation surface by the right hand of the user.

(36) In the information processing apparatus of any one of (24) to (35), the mapping unit changes the mapping according to a number of positions on the operation surface which are operated by the user.

(37) An information processing method including: performing a mapping which associates a position on an operation surface which is operated by a user with a position on a display screen on which an image is displayed based on graphics which are displayed on the display screen; and detecting a correspondence point which is a position on the display screen and corresponds to the position on the operation surface which is operated by the user based on a result of the mapping.

(38) A program causing a computer to function as: a mapping unit that performs a mapping which associates a position on an operation surface which is operated by a user with a position on a display screen on which an image is displayed based on graphics which are displayed on the display screen; and a detection unit that detects a correspondence point which is a position on the display screen and corresponds to the position on the operation surface which is operated by the user based on a result of the mapping.

(39) An information processing system including: a terminal that includes an operation surface which is operated by a user; and an information processing apparatus which performs a process according to an operation of the operation surface. The information processing apparatus includes a mapping unit that performs a mapping which associates a position on the operation surface with a position on a display screen on which an image is displayed based on graphics which are displayed on the display screen; and a detection unit that detects a correspondence point which is a position on the display screen and corresponds to the position on the operation surface which is operated by the user based on a result of the mapping.

It should be understood by those skilled in the art that various modifications, combinations, sub-combinations and alterations may occur depending on design requirements and other factors insofar as they are within the scope of the appended claims or the equivalents thereof.

The invention claimed is:

1. An information processing apparatus comprising:
a touch panel; and
at least one processor configured to:
   map a touch point detected through the touch panel to a correspondence point related to an on-screen-keyboard (OSK);
   display an image which indicates a position of the correspondence point on a display screen; and
   display a letter of a key of the OSK in an input section based on a user operation,
wherein the correspondence point is offset in a y-direction from a position of the touch point,
wherein when the touch point is positioned on a first side of the touch panel, the correspondence point is positioned within an area that is offset in a first direction of an x-direction from the position of the touch point, and
wherein when the touch point is positioned on a second side of the touch panel, which is a side opposite to the first side, the correspondence point is positioned within an area that is offset in a second direction of the x-direction from the position of the touch point, the second direction being opposite to the first direction.

2. The information processing apparatus of claim 1, wherein the first direction of the x-direction is to the right of the position of the touch point, and the second direction of the x-direction is to the left of the position of the touch point.

3. The information processing apparatus of claim 2, wherein first side of the touch panel is a left side of the touch panel, and the second side of the touch panel is a right side of the touch panel.

4. The information processing apparatus of claim 1, wherein the correspondence point is offset to an upper side in the y-direction from the position of the touch point.

5. The information processing apparatus of claim 1, wherein an offset amount of the offset of the correspondence point in the y-direction from a position of the touch point is uniform regardless of a y-coordinate value of the touch point.

6. The information processing apparatus of claim 1, wherein the user operation comprises a removal of a finger from the touch panel.

7. The information processing apparatus of claim 1, wherein the at least one processor is further configured to change a display format of the displayed image.

8. The information processing apparatus of claim 7, wherein the display format includes a color of a graphical user interface (GUI) component.

9. The information processing apparatus of claim 1, wherein the information processing apparatus is a smart phone.

10. The information processing apparatus of claim 1, wherein a direction upward from the apparatus is set to a y-axis, and a vertical direction of the touch screen is set to an x-axis.

11. The information processing apparatus of claim 1, wherein there is a gap which is not mapped to the OSK between the first side of the touch panel and the second side of the touch panel.

12. The information processing apparatus of claim 1, wherein a part of the first side of the touch panel and a part of the second side of the touch panel are mapped to a same key on the OSK.

13. The information processing apparatus of claim 12, wherein the same key is a space key.

14. An information processing method comprising:
mapping a touch point detected through a touch panel to a correspondence point related to an on-screen-keyboard (OSK);
displaying an image which indicates a position of the correspondence point on a display screen; and
displaying a letter of a key of the OSK in an input section based on a user operation,
wherein the correspondence point is offset in a y-direction from a position of the touch point,
wherein when the touch point is positioned on a first side of the touch panel, the correspondence point is positioned within an area that is offset in a first direction of an x-direction from the position of the touch point, and
wherein when the touch point is positioned on a second side of the touch panel, which is a side opposite to the first side, the correspondence point is positioned within an area that is offset in a second direction of the x-direction from the position of the touch point, the second direction being opposite to the first direction.

15. A non-transitory computer-readable medium having embodied thereon a program, which when executed by a computer causes the computer to execute a method, the method comprising:
mapping a touch point detected through a touch panel to a correspondence point related to an on-screen-keyboard (OSK);
displaying an image which indicates a position of the correspondence point on a display screen; and
displaying a letter of a key of the OSK in an input section based on a user operation,
wherein the correspondence point is offset in a y-direction from a position of the touch point,
wherein when the touch point is positioned on a first side of the touch panel, the correspondence point is positioned within an area that is offset in a first direction of an x-direction from the position of the touch point, and
wherein when the touch point is positioned on a second side of the touch panel, which is a side opposite to the first side, the correspondence point is positioned within an area that is offset in a second direction of the x-direction from the position of the touch point, the second direction being opposite to the first direction.

16. An information processing apparatus comprising:
a touch panel; and
at least one processor configured to:
map a touch point detected through the touch panel to a correspondence point related to an on-screen-keyboard (OSK);
display an image which indicates a position of the correspondence point on a display screen; and
display a letter of a key of the OSK in an input section based on a user operation,
wherein the correspondence point is offset in a y-direction from a position of the touch point,
wherein an offset amount of the offset of the correspondence point in the y-direction from a position of the touch point is uniform regardless of a y-coordinate value of the touch point, and
wherein the correspondence point is positioned within a center area whose centroid is offset in an x-direction from the position of the touch point towards a center of the touch panel.

17. The information processing apparatus of claim 16, wherein the correspondence point is offset to an upper side in the y-direction from the position of the touch point.

18. The information processing apparatus of claim 16, wherein the user operation comprises a removal of a finger from the touch panel.

19. The information processing apparatus of claim 16, wherein the at least one processor is further configured to change a display format of the displayed image.

20. The information processing apparatus of claim 19, wherein the display format includes a color of a graphical user interface (GUI) component.

21. The information processing apparatus of claim 16, wherein the information processing apparatus is a smart phone.

22. The information processing apparatus of claim 16, wherein a direction upward from the apparatus is set to a y-axis, and a vertical direction of the touch screen is set to an x-axis.

23. An information processing method comprising:
mapping a touch point detected through a touch panel to a correspondence point related to an on-screen-keyboard (OSK);
displaying an image which indicates a position of the correspondence point on a display screen; and
displaying a letter of a key of the OSK in an input section based on a user operation,
wherein the correspondence point is offset in a y-direction from a position of the touch point,
wherein an offset amount of the offset of the correspondence point in the y-direction from a position of the touch point is uniform regardless of a y-coordinate value of the touch point, and
wherein the correspondence point is positioned within a center area whose centroid is offset in an x-direction from the position of the touch point towards a center of the touch panel.

24. A non-transitory computer-readable medium having embodied thereon a program, which when executed by a computer causes the computer to execute a method, the method comprising:
mapping a touch point detected through a touch panel to a correspondence point related to an on-screen-keyboard (OSK);
displaying an image which indicates a position of the correspondence point on a display screen; and
displaying a letter of a key of the OSK in an input section based on a user operation,
wherein the correspondence point is offset in a y-direction from a position of the touch point,
wherein an offset amount of the offset of the correspondence point in the y-direction from a position of the touch point is uniform regardless of a y-coordinate value of the touch point, and
wherein the correspondence point is positioned within a center area whose centroid is offset in an x-direction from the position of the touch point towards a center of the touch panel.

* * * * *